United States Patent
Schmidt-Lackner et al.

(10) Patent No.: US 11,004,289 B2
(45) Date of Patent: *May 11, 2021

(54) AUTOMATED ENTRY

(71) Applicants: Merrick Schmidt-Lackner, Los Angeles, CA (US); Clark Li, Thousand Oaks, CA (US)

(72) Inventors: Merrick Schmidt-Lackner, Los Angeles, CA (US); Clark Li, Thousand Oaks, CA (US)

(73) Assignee: CONSUMER 2.0, INC., Los Angeles, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/952,019

(22) Filed: Apr. 12, 2018

(65) Prior Publication Data
US 2018/0232978 A1    Aug. 16, 2018

Related U.S. Application Data

(63) Continuation of application No. 15/904,339, filed on Feb. 24, 2018, which is a continuation-in-part of
(Continued)

(51) Int. Cl.
*G07C 9/00* (2020.01)
*G07C 9/32* (2020.01)
(Continued)

(52) U.S. Cl.
CPC .............. *G07C 9/32* (2020.01); *G06Q 50/163* (2013.01); *G07C 9/00309* (2013.01);
(Continued)

(58) Field of Classification Search
CPC .. G07C 9/00182; G07C 9/32; G07C 9/00309; G07C 9/00571; G07C 9/00896;
(Continued)

(56) References Cited

U.S. PATENT DOCUMENTS 7,333,943 B1 * 2/2008 Charuk ................. G06Q 10/10
705/26.1
9,235,943 B2 * 1/2016 Scalisi ............... G06K 9/00288
(Continued)

*Primary Examiner* — An T Nguyen
(74) *Attorney, Agent, or Firm* — Douglas L. Weller

(57) ABSTRACT

Providing automated entry to a property includes an automated entry application receiving registration information from a visitor who desires to use the automated system for visiting properties. The automated entry application allows the visitor to schedule an automated showing of a property at a visitor selected time and date. A central property application enables the visitor to unlock a short-range wireless enabled lock box or the short-range wireless enabled automated door lock at the visitor selected time and date. The short-range wireless enabled device obtains an identifying number of the short-range wireless enabled lock box or the short-range wireless enabled automated door lock. The short-range wireless enabled device sends a wireless signal to the short-range wireless enabled lock box or the short-range wireless enabled automated door lock to unlock the short-range wireless enabled lock box or the short-range wireless enabled automated door lock.

20 Claims, 33 Drawing Sheets

Related U.S. Application Data application No. 15/727,532, filed on Oct. 6, 2017, which is a continuation-in-part of application No. 14/260,247, filed on Apr. 23, 2014, now Pat. No. 9,875,590, which is a continuation-in-part of application No. 13/551,566, filed on Jul. 17, 2012, now Pat. No. 9,881,347.

(60) Provisional application No. 61/582,163, filed on Dec. 30, 2011.

(51) Int. Cl.
*H04W 4/021* (2018.01)
*G06Q 50/16* (2012.01)

(52) U.S. Cl.
CPC ..... *G07C 9/00571* (2013.01); *G07C 9/00896* (2013.01); *H04W 4/021* (2013.01); *G07C 2009/00936* (2013.01); *G07C 2209/08* (2013.01)

(58) Field of Classification Search
CPC ...... G07C 2209/08; G07C 2009/00936; G07C 9/00103; G07C 2009/00769; H04W 4/021; G06Q 50/163; G06Q 50/16; E05B 47/0001
See application file for complete search history.

(56) References Cited

U.S. PATENT DOCUMENTS

| | | | |
|---|---|---|---|
| 10,217,301 B2* | 2/2019 | Schmidt-Lackner | G07C 9/00174 |
| 10,325,426 B2* | 6/2019 | Schmidt-Lackner | G06Q 50/163 |
| 2006/0178940 A1* | 8/2006 | Taylor | G06Q 30/0601 705/26.1 |
| 2006/0290519 A1* | 12/2006 | Boate | G07C 9/28 340/573.4 |
| 2007/0156429 A1* | 7/2007 | Godar | G06Q 10/02 705/5 |
| 2007/0176739 A1* | 8/2007 | Raheman | G07C 9/00904 340/5.64 |
| 2007/0260465 A1* | 11/2007 | Cook | G06Q 30/0603 705/316 |
| 2008/0000966 A1* | 1/2008 | Keiser | G06Q 10/10 235/382 |
| 2009/0153291 A1* | 6/2009 | Larson | G07C 9/00896 340/5.33 |
| 2011/0040692 A1* | 2/2011 | Ahroon | G06Q 50/163 705/307 |
| 2012/0246024 A1* | 9/2012 | Thomas | G06Q 30/06 705/26.41 |
| 2012/0280789 A1* | 11/2012 | Gerhardt | H04W 12/003 340/5.61 |
| 2012/0299700 A1* | 11/2012 | Davis | G07C 9/00571 340/5.54 |
| 2013/0024222 A1* | 1/2013 | Dunn | G07C 9/00904 705/5 |
| 2013/0159142 A1* | 6/2013 | Moreno | G06Q 30/0601 705/26.63 |
| 2013/0257590 A1* | 10/2013 | Kuenzi | G07C 9/00174 340/5.65 |
| 2014/0232522 A1* | 8/2014 | Schmidt-Lackner | G06Q 10/109 340/5.28 |
| 2015/0235332 A1* | 8/2015 | Styve | G06Q 50/16 705/7.13 |
| 2015/0267438 A1* | 9/2015 | Martinez | E05B 47/02 70/278.1 |
| 2015/0269799 A1* | 9/2015 | Martinez | G07C 9/00182 70/277 |
| 2015/0363989 A1* | 12/2015 | Scalisi | H04N 7/186 348/143 |
| 2016/0034996 A1* | 2/2016 | Min | G06Q 40/025 705/26.61 |
| 2016/0093007 A1* | 3/2016 | Richardson | G06Q 30/0611 705/80 |
| 2017/0200243 A1* | 7/2017 | Morgan | G06Q 50/16 |
| 2017/0256111 A1* | 9/2017 | Chung | G07C 9/00309 |
| 2017/0337647 A1* | 11/2017 | Vaynshteyn | G06Q 50/18 |
| 2017/0357921 A1* | 12/2017 | Glucroft | G06Q 10/0635 |
| 2018/0033103 A1* | 2/2018 | Schmidt-Lackner | G07C 9/38 |
| 2018/0053227 A1* | 2/2018 | Camhi | G06Q 30/0281 |
| 2018/0182194 A1* | 6/2018 | Schmidt-Lackner | G07C 9/32 |
| 2018/0190049 A1* | 7/2018 | Schmidt-Lackner | G06Q 30/06 |
| 2018/0247473 A1* | 8/2018 | Panchal | G07C 9/00174 |
| 2019/0043145 A1* | 2/2019 | Morgan | G06Q 50/01 |
| 2019/0080426 A1* | 3/2019 | Jennings | G06F 3/04886 |
| 2020/0286006 A1* | 9/2020 | Huang | G07C 9/00563 |

* cited by examiner

Record credit card on file for showing

○ Skip credit card check (not recommended)

● Enter new credit card

Your credit card will be stored on our secure server. All fields are required.

Card Number *  [          ]

Expiration *  [    ] [ ▼ ] [    ▼ ]

CCV *  [    ]

Billing Zip Code *  [        ]

[ Save Credit Card ]

---

Today 9:00 AM address: 1313 Mockingbird Lane, Morkan Hill, CA
lockbox: Front door -When you arrive, locate lockbox and serial #
-Dial (408) 555-1212
-Follow voice instructions

~92

 [ Text Message ]     [ Send ]

Fri, Mar 7, 2:08 PM to: 4085551212
address: 1313 Mockingbird Lane,
Morkan Hill, CA 95037
Unit p0122151
lockbox: 444
code: ENT + 1421897 + ENT
Code expires in 1 hour.

— 95

Please fill out this quick property survey:
https://secure.property.com/questionaires/123
for 1313 Mockingbird Lane
Thank you. Happy renting.

Mon, Feb 24, 10:33 PM

Like a good dating site, we want to verify this home is a perfect match.
We just have a few questions to ask you before your showing will be approved.

Desired move in date:

Pets
○ Yes  ○ No

Combined household monthly income before taxes:
$ _____ / Month

Do you owe a previous landlord any money?
○ Yes  ○ No

Have you ever been evicted?
○ Yes  ○ No

Are you currently in bankruptcy?
○ Yes  ○ No

Do you have a felony on your record?
○ Yes  ○ No

[ Submit ]

| Match | Move in date | Name | Viewing | Viewing date | Phone | Survey | Agent | Matched properties |
|---|---|---|---|---|---|---|---|---|
| ○ ← | 08/31/2017 | Jane Doe | auto viewing | 08/31/2017 - 08:38 PM | (555) 555-1100 | | | ○ |
| ○ | 08/31/2017 | Jim Doe | auto viewing | 08/31/2017 - 01:44 PM | (555) 451-1133 | | | ○ |
| ○ | 08/30/2017 | John Doe | auto viewing | 08/23/2017 - 07:02 AM | (555) 111-9920 | | | ○ |
| ○ | 08/31/2017 | Max Doe | auto viewing | 08/28/2017 - 01:56 AM | (555) 461-5301 | interested (view) | | ○ |
| ○ | 08/30/2017 | Billy Doe | auto viewing | 08/22/2017 - 07:25 AM | (555) 111-9905 | | | ○ |
| ○ | 08/03/2017 | Susan Doe | auto viewing | 08/21/2017 - 06:34 AM | (555) 122-2233 | interested (view) | | ○ |
| ○ | 08/31/2017 | Nancy Doe | auto viewing | 08/21/2017 - 06:59 AM | (555) 111-9917 | | | ○ |
| ○ | 08/29/2017 | Mel Doe | auto viewing | 08/21/2017 - 06:56 AM | (555) 111-9918 | | | ○ |
| ○ | 08/31/2017 | Annie Doe | auto viewing | 08/21/2017 - 06:51 AM | (555) 111-9915 | | | ○ |
| ○ | 08/31/2017 | Bob Doe | auto viewing | 08/21/2017 - 06:22 AM | (555) 111-9914 | | | ○ |

| Unit Details | CRM tag | Bedrooms * | Bathrooms * | Rent Per Mo. * | Deposit | Sq. Ft. |
|---|---|---|---|---|---|---|
| | | 7 | 7 | $77777 | $ 777 | 77 |

FIG. 25 — 250

Past Due Account(s) ⊙ exclude medical debt  ⊙ exclude student loan debt   Weight [3⌄]

Deny up to [60] days    accept conditionally between [60] and [120] days    Approve any accounts longer than [120] days    Past due amount threshold [$ 100⌄]

⊕ add rule

FIG. 26 — 260

Repossession(s) ⊙ exclude mortgage foreclosure   Weight [2⌄]

Deny up to [0]    accept conditionally between [0] and [2]    Deny at or above [2]

⊕ add rule

FIG. 27 — 270

VIEWING PROGRESS

80%

Thanks!

Please rate your interest in the property

How interested are you in the property?

- ● Very interested — 371
- ○ Interested
- ○ Somewhat interested — 370
- ○ Not very interested
- ○ Not at all interested What would increase your interest in the property?

| Option 1 | ✓ |
| Option 2 | ✓ | — 372
| Option 3 | |
| Option 4 | |

SUBMIT SURVEY — 373

FIG. 37

AUTOMATED ENTRY

BACKGROUND

Renting or buying a place to live can be a time-consuming endeavor. Available properties are advertised, for example, by signs on or near the property, advertisements in printed media, in radio or in television, posting on internet sites and so on.

Renters and buyers often consider a number of criteria when selecting a place such as location, price, square footage of inhabitable area, number of bedrooms or bathrooms, condition of property and so on. A renter or buyer of a property often desires to make a detailed personal inspection of a property before making a decision to rent or purchase.

Viewing properties can be time consuming. Often times it requires making arrangement with one or more of a listing agent, a property manager, a landlord, an owner and so on. Because of conflicting schedules, it may take a while before some one with access to the property can meet the prospective buyer or renter at the property and conduct a tour. When there are many properties to be inspected, this can be an onerous burden on the time of the prospective purchaser or renter. It can also be an onerous burden on the listing agent, property manager, or etc. when multiple showings are required to obtain a rental or a purchase.

BRIEF DESCRIPTION OF DRAWINGS

FIG. 11 illustrates an interface for accepting information from a prospect in accordance with an implementation.

FIG. 12 illustrates information sent to a prospect in accordance with an implementation.

FIG. 14 illustrates an interface used for preleasing scheduling properties in accordance with an implementation.

FIG. 19 illustrates a renter questionnaire feature in accordance with an implementation.

FIG. 20 and FIG. 21 illustrate a property manager information feature in accordance with an implementation.

FIG. 22, FIG. 23, FIG. 24 and FIG. 25 illustrate a residential score feature in accordance with an implementation.

FIG. 26, FIG. 27, FIG. 28, FIG. 29 and FIG. 30 illustrate a past due accounts feature in accordance with an implementation.

FIG. 31, FIG. 32, FIG. 33, FIG. 34, FIG. 35, FIG. 36, FIG. 37 and FIG. 38 are simplified screen shots that illustrate an automated showing for a property in accordance with an implementation.

DETAILED DESCRIPTION

A system provides automated entry to a prospective buyer or renter of properties. The provision of automated entry eliminates the need to arrange a tour with an agent or landlord. The system automates the tour registration process and property entry. This eliminates the need for an on-site representative of the property.

Figure 1:
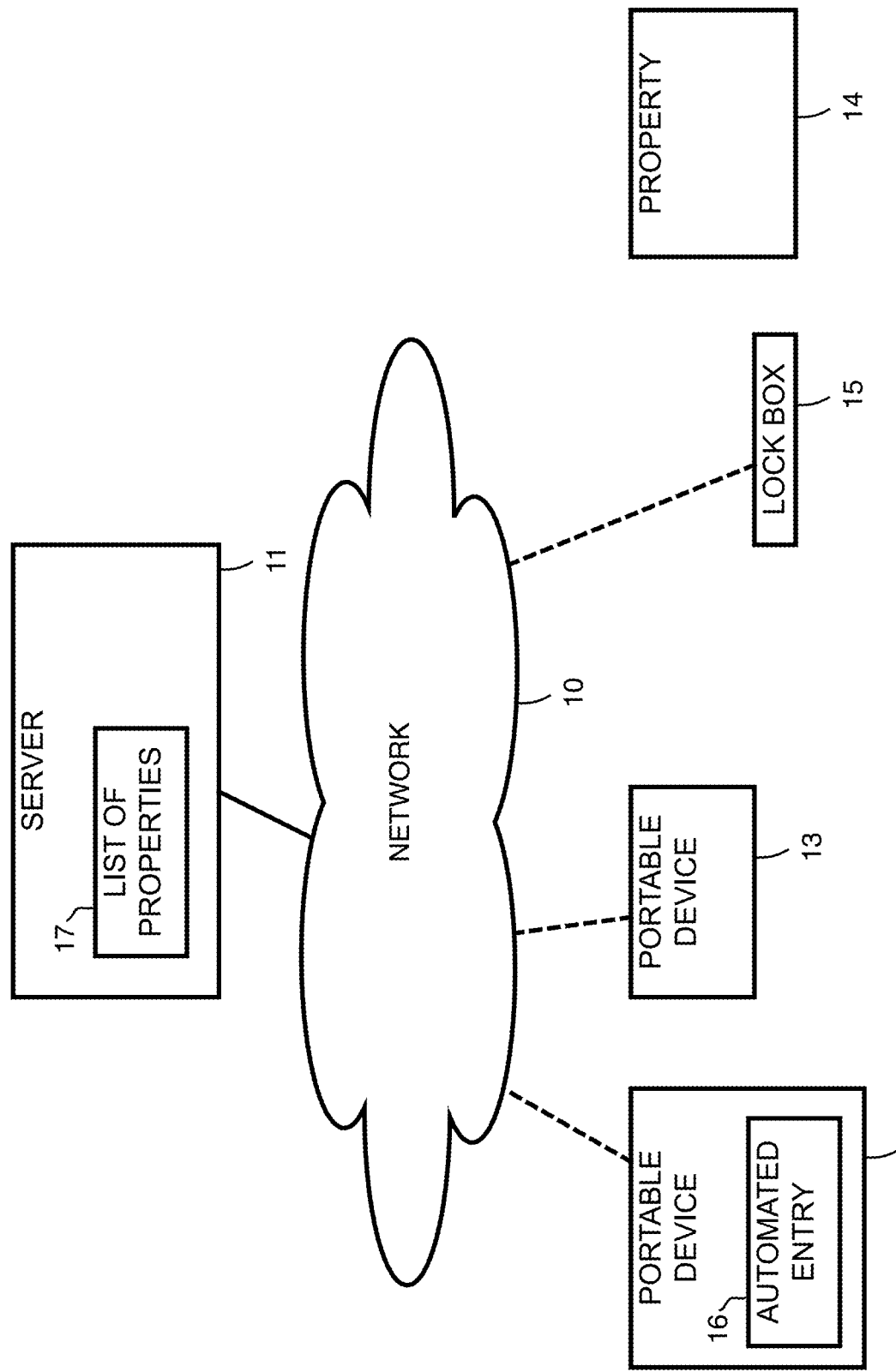
FIG. 1 is a simplified block diagram of a system that provides automated entry to a property in accordance with an implementation.

FIG. 1 shows a simplified block diagram of the system. An automated entry module 16 is located on a portable device 12. For example, portable device 12 is a smart phone, another type of cellular phone, a media player, a personal e-mail device, a personal data assistant ("PDA"), a handheld gaming device, a digital camera, a computer tablet, a laptop computer or any other type of device that can be transported to a property and that has processing capability sufficient to implement the functionality of automated entry module 16.

Other portable devices, such as a portable device 13, can also host an automated entry module similar to automated entry module 16. Such portable devices can be connected, through a network 10, to one or more servers, such as a server 11 shown in FIG. 1. Network 10 is, for example, the Internet, a cellular phone network or any other type of network or combinations of network that allow a personal device to connect to a server. Server 11, for example, contains a list of properties 17. List of properties 17 may include, for example, properties available to rent and/or properties available to purchase. List of properties 17 also, for example, contains information indicating which properties are currently available for automated entry as well as information on how automated entry is to be provided. While list of properties 17 is shown within server 11, list of properties can be within portable device 12 or in any other location where it is accessible to automate entry module 16. List of properties 17, for example, is a part of a database that stores information on properties such as visit logs and so on.

Automated entry module 16 allows a user to search through property list 17 in order to find properties to search. Herein, user is used synonymously with visitor. One of the properties in property list 17 for which automated entry is enabled is represented in FIG. 1 by a property 14. Information stored within property list 17, can be utilized by automated entry module 16 to allow a user of portable device 12 automated entry to property 14.

For example, a lock box 15 is shown in FIG. 1 representing one of the ways automated entry module 16 allows a user of portable device 12 to access property 14. For example, lock box 15 contains a key that will open a door allowing entry to property 14. To open lock box 15, automated entry module 16 can for example, depending upon various implementations of lock box 15, provide the user with a code to open lock box 15, provide portable device 12 with a signal to open lock box, provide portable device 12 with a pattern to display for optical scanning by lock box 15.

Alternatively, automated entry module 16 can allow a user of portable device 12 to access property 14 in other ways. For example, automated entry module 16 can provide instructions or codes to the user of portable device 12 to enable the user of portable device 12 to open a lock to allow access to property 14. Alternatively, portable device 12 can function as a key to open lock box 15, or a door or entry way of property 14. For example, portable device 15 transmits a signal using an appropriate protocol and radio signal (e.g., RFID signal or other near field communication) to direct lockbox 15 or a door on property 14 to be opened. Alternatively, portable device 12 can display a pattern for an optical reader associated with a property door. For example, lock box 15 is a short-range wireless enabled lock box and portable device 15 transmits a short-range wireless interconnection signal to lockbox 15 or a short-range wireless enabled lock on a door on property 14. For example, the short-range wireless interconnection is a Bluetooth short-range wireless interconnection. For example, automated entry module 16 is any application running on portable device 12 that enables automated entry. Such an automated entry application may include many other features, such as allowing for search and application to rent properties. Any application that facilitates or helps facilitates automated entry to properties is referred to herein as an automated entry, regardless of the additional number or primacy of other functionality provided by the automated entry application and regardless of what the application might be called. As long as an application facilitates or helps facilitates automated entry to properties that application is an automated entry application.

As will be additionally described below, portable device 12 can receive the ability to access property 14 at any suitable time, including, for example, upon checking-in remotely. In this scenario, the entry information can be securely transmitted to portable device 12 through, for example, network 10, which in this case includes, for example, a secure wireless network. The ability to utilize portable device 12 to gain access to property 14 allows a prospective buyer or renter using device 12 to gain access to property 14 without the requirement of an appointment with a listing agent, broker, a landlord, property owner, property manager, or some other keeper of property 14.

FIG. 1 also shows a manager computing device 18 and a manager computing device 19. For example, applications running on manager computing device 18 and a manager computing device 19 are used by property managers or property owners to provide manager input pertaining to properties. The manager input is used by a rent system server program running on server 11 that manages information pertaining to properties provided to potential renters searching for rental properties using rental applications operating on portable devices such as portable device 13. For example, manager computing device 18 and manager computing device 19 are each a portable computer device, smart phone, desktop system, or any other type of computing device capable of running a programming and communicating through network 10.

Figure 2:
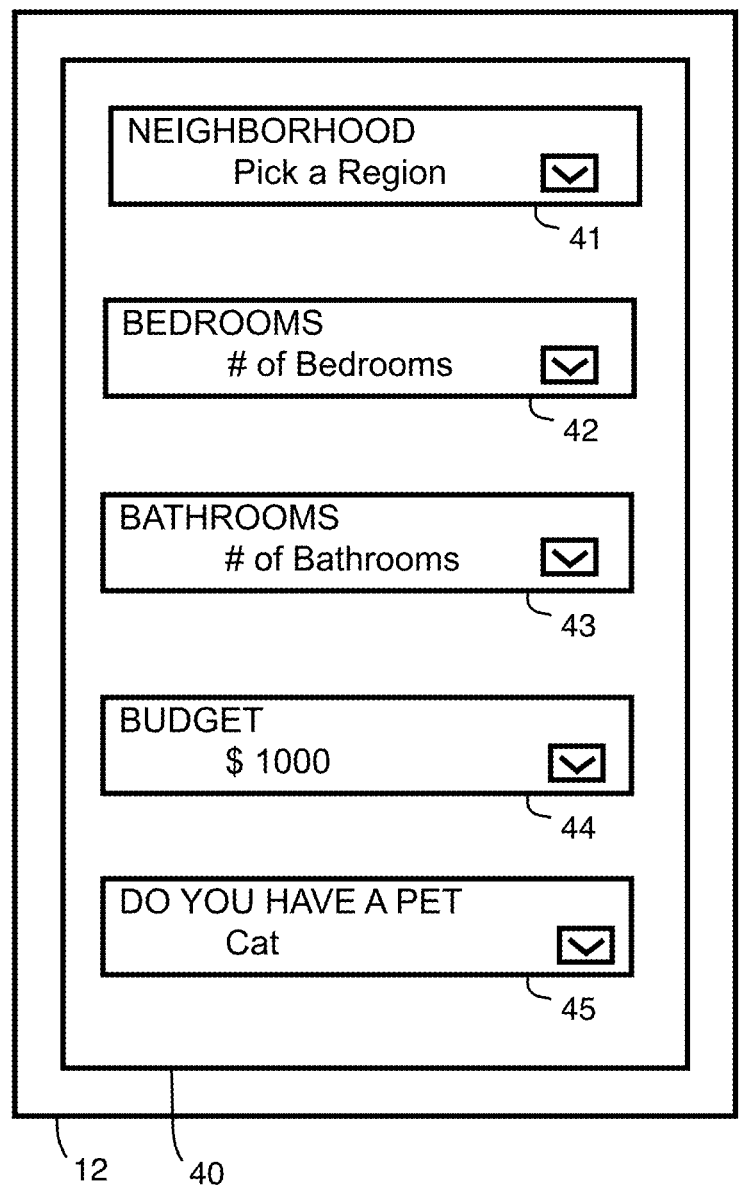
FIG. 2 is an example of a simplified device display illustrating use of a search facility of a system that provides automated entry to a property in accordance with an implementation.

FIG. 2 is an example of a display of portable device 12 illustrating the ability of portable device 12 to access property list 17 so that a user of portable device can search for properties to purchase or to rent.

For example, within a display 40 of portable device 12, search fields allow a user to specify search criteria for searching through list of properties 17. The representative search fields shown in FIG. 2 include a neighborhood search field 41, a number of bedrooms search field 42, a number of bathrooms search field 43, a budget search field 44 and a pet search field 45. These search fields are exemplary, as other search fields such as square footage, information on available parking, number of stories and so on can be included in addition to or instead of the search fields shown in FIG. 2.

In FIG. 2, the search fields receive user input by way of pull down selection menus, illustrated in FIG. 2 by an arrow being included within each search field. Other methods, such as text boxes, check boxes and so on can be used to receive search criteria information from a user.

Based on search criteria received from the user of portable device 12, portable device 12 can display search results. For example, the search criteria are sent via a database query to server 11. For example, only the properties meeting the input criteria and which are available for automated tour at the time of the search are returned as search results. For example, if list of properties 17 is within portable device 12, this list may be searched without accessing a server. An example of returned search results is provided in FIG. 3.

Figure 3:
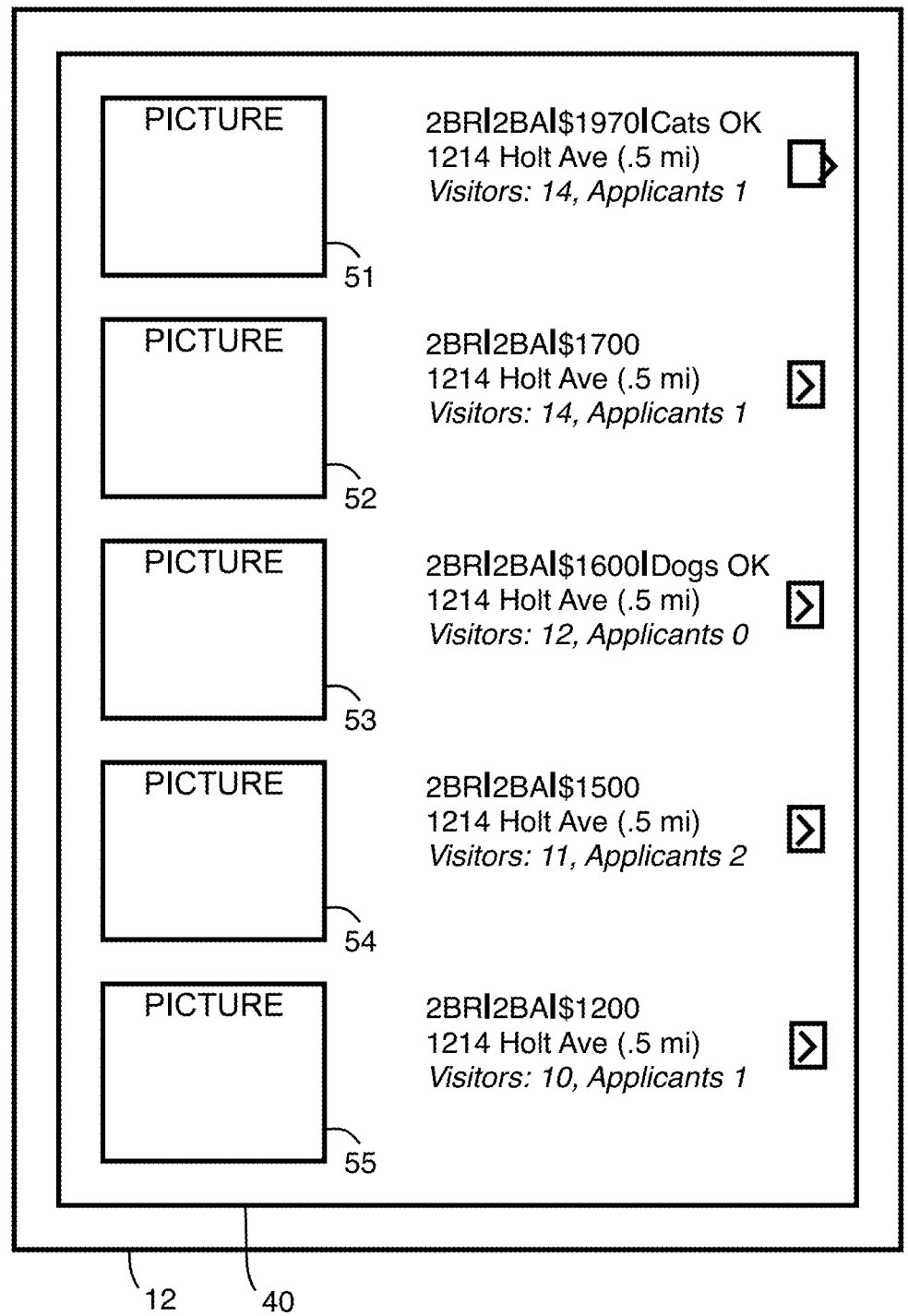
FIG. 3 is a simplified device display illustrating results of a search in accordance with an implementation.

FIG. 3 shows, for example, pictures for five properties displayed on display 40 of portable device 12. Each of a property picture 51, a property picture 52, a property picture 53, a property picture 54 and a property picture 55 is accompanied by additional information on the property as well as an arrow that allows additional detail to be accessed. For example, the number of prospective renters who have already viewed each displayed property and the number of renters who have applied to rent each property 14 are included in the additional information. FIG. 3 is only an example of search results format. Other search results format known in the art can be used based on implementation requirements, display size and so on.

Figure 4:
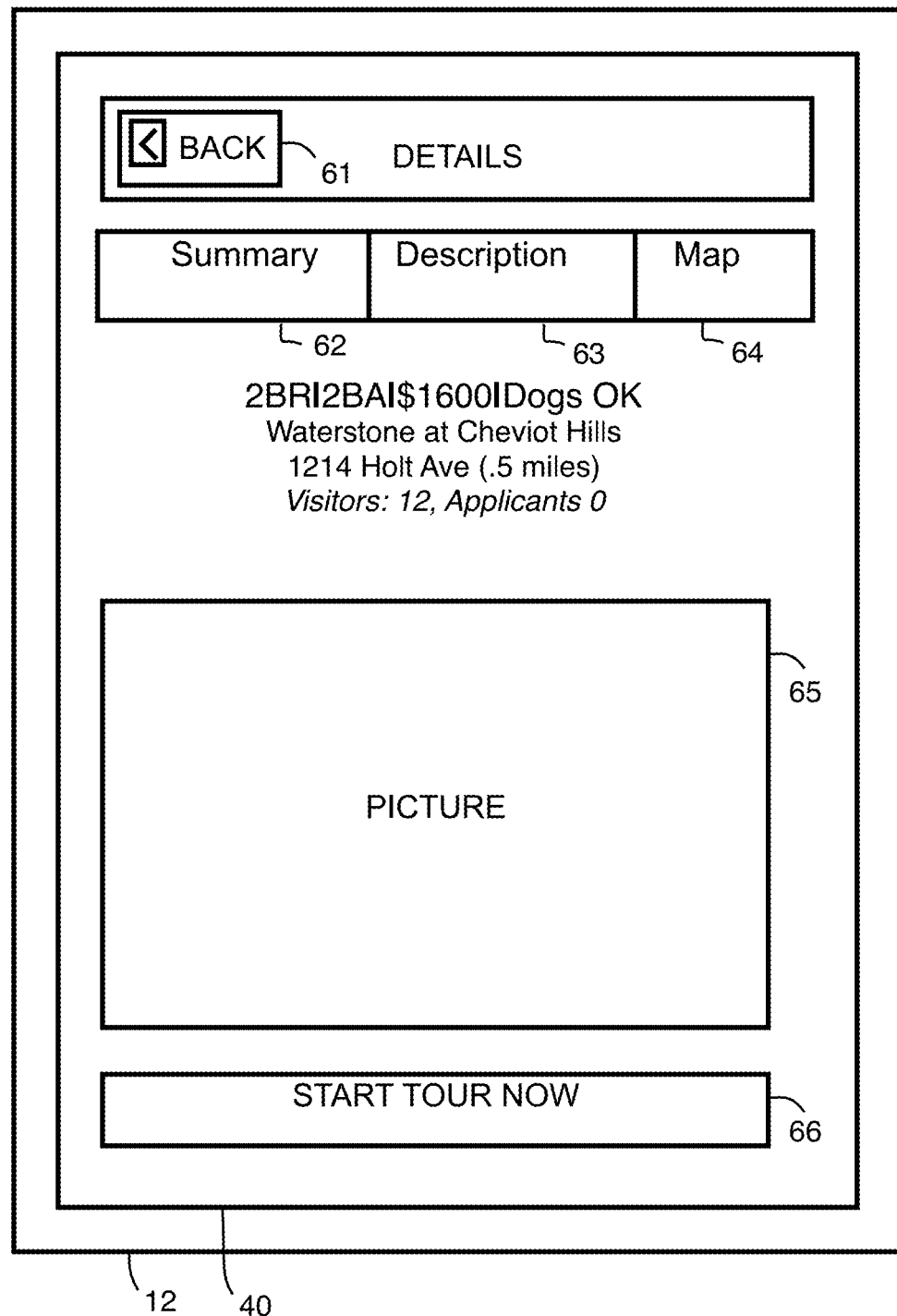
FIG. 4 is a device display illustrating a property detail display in accordance with an implementation.

FIG. 4 shows a simplified version of a display that appears when an arrow associated with picture 53 is selected. Additional information on that property is displayed. For example, a bigger picture 65 of the property is shown and/or a series of pictures of the property are available. FIG. 4 is only an example of information that can be displayed about the property. Many other types of information can be displayed. For example, the information may include listing information provided by listing agents, property managers, landlords and so on. The information may be associated with one or more databases that are further associated with one or more servers or can include information previously downloaded to portable device 12. The information can include preset times and methods for touring one or more vacancies.

The user of portable device 12 can select a button 62 to access a summary of the property. The user of portable device 12 can select a button 63 to access a description of the property. The user of portable device 12 can select a button 64 to access a map showing a location of the property. The user of portable device 12 can select a button 61 to go back to the previous screen shown in FIG. 3. To take a tour of the property, including obtaining physical access to the property, a user of portable device can select a start tour now button 66.

Figure 5:
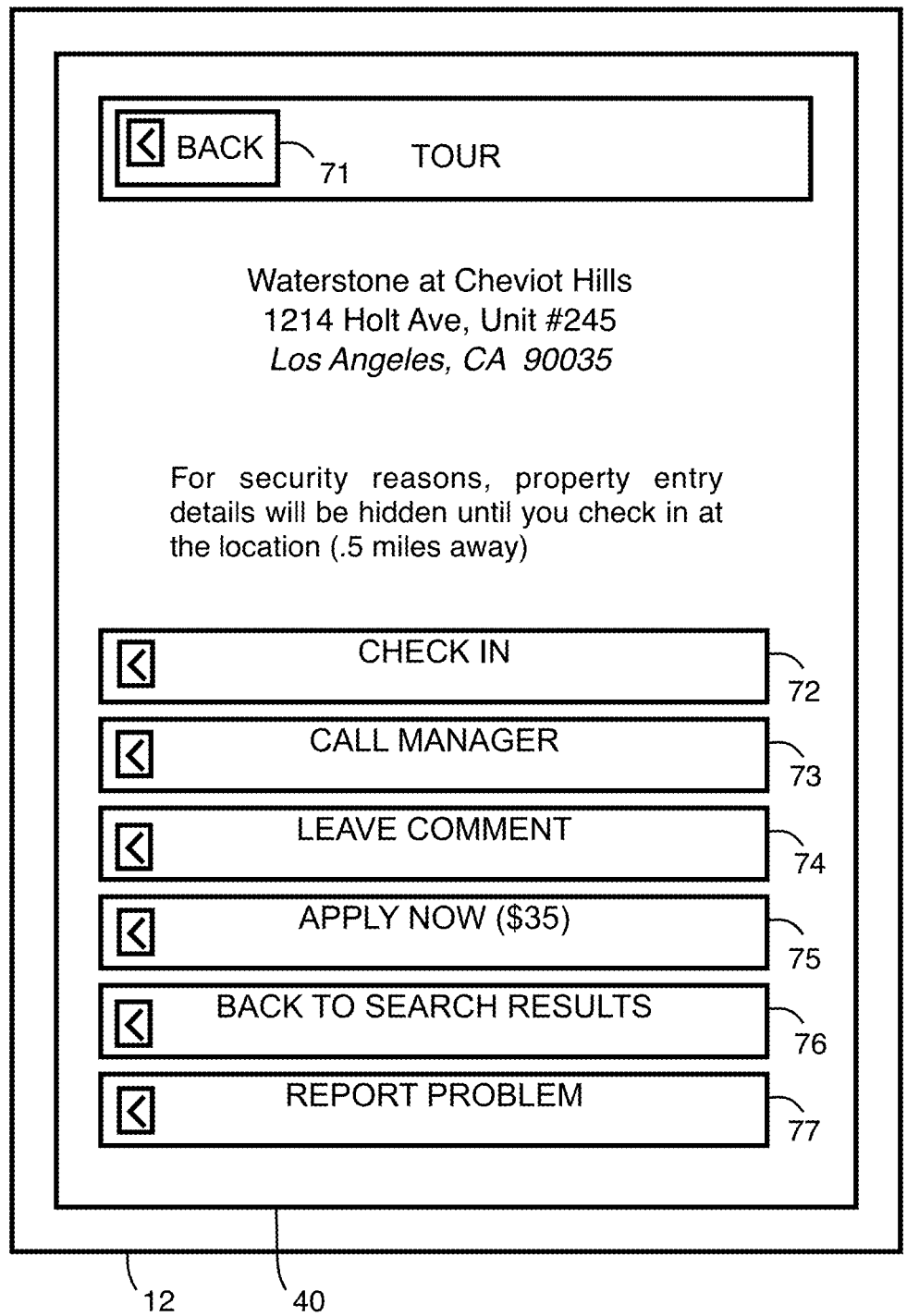
FIG. 5 is a device display illustrating use of an automated entry facility of a system that provides automated entry to a property in accordance with an implementation.

FIG. 5 shows a simplified version of a display that appears when the user of portable device 12 selects start tour now button 66. From the menu displayed in FIG. 5, the user of portable device 12 can return to the previously displayed menu by selecting a back button 71. To check in, in order to obtain access to the selected property, the user of portable device 12 can select a button 72. To call a manager of the selected property, the user of portable device 12 can select a button 73. For example, if the user of portable device 12 has questions, before, during or after viewing the property, the user of portable device 12 can call a phone number obtained by selecting button 73 shown in FIG. 5. If the property manager, owner or assistant is not available to answer the call, the call will go to voice mail. Records of all voice mail calls are associated with the prospective property stored in a database on server 11.

To leave a comment to the manager of the selected property, the user of portable device 12 can select a button 74 The ability to leave comments allows the user of portable device 12 to provide feedback to listing agents, property managers, landlords, etc. about their experience visiting the selected property.

For example, upon selecting button 72, portable device 12 notifies server 11. Server 11 then immediately sends an entry notification, such as an e-mail, text message or automated voicemail to the property manager and/or owner. For example, the entry notification includes a name and contact information for the user of portable device 12. Server 11 also, for example, records in a database the entry of the user of portable device. The database keeps a log of user entries, e-mails, texts, voicemails and other contacts for each property, which are accessible by property managers and owners for their property.

To submit an application pertaining to the selected property, the user of portable device 12 can select a button 75. A fee associated with the application is shown on button 75. To return to a window showing search results, the user of portable device 12 can select a button 76. To report a problem, the user of portable device 12 can select a button 77.

FIG. 5 is only an example of a menu for a tour of the property. Other menus with additional and/or alternative features can be implemented on portable device 12 and displayed on display 40.

In some implementations, it is required that a user register before being allowed automated entry to properties. For example, FIG. 7 shows a registration process required for a user of portable device 12 to obtain automated entry to properties.

In a block 21, the registration process is started. In a block 22, user information is obtained from the user. For example, the user information can include identification information such as name, contact information, current residence, birth date, login identification and password, drivers license and so on. This information can be used, for example, in a block 23 to verify the user. The verification can be as simple as sending a confirmation e-mail, or can be more complex, including, for example, running a credit check and checking references. In addition to identification information, in a block 24, payment information is obtained. This payment information can be, for example, credit card information, debit card information, bank information or some other information that will allow payment to be obtained from the user of portable device 12 when services are rendered. For example, the information obtained from the user is stored in server 11.

In a block 25, the information obtained from the user of portable device 12 is checked to determine if it is sufficient to qualify the user of portable device 12 as approved for automated access of properties. If so, in a block 26 the approval is recorded in a database located, for example, in server 11. In a block 27, the registration process is completed. This completion of the registration process includes, for example, providing a message to the user of portable device 12 indicating whether or not the user of portable device 12 is approved for automated access of properties.

Figure 7:
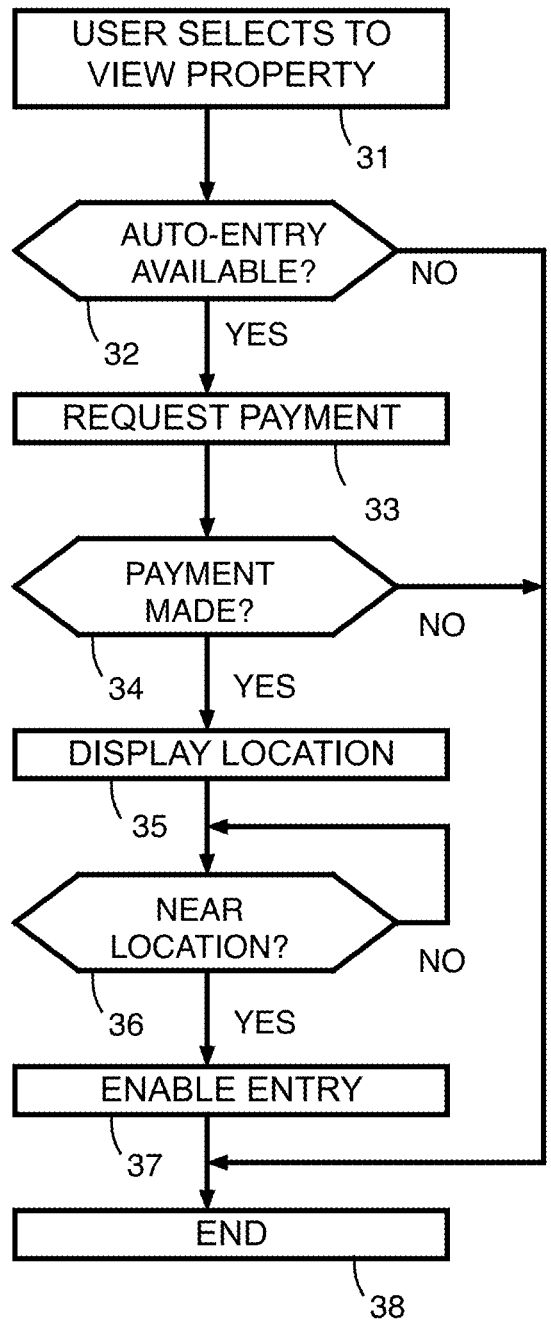
FIG. 7 is a simplified flowchart illustrating use of a system that provides automated entry to a property in accordance with an automated entry module is located on portable devices implementation.

FIG. 7 illustrates an example of a process to provide automated entry to property 14 to the user of portable device 12. In a block 31, the user of portable device 12 selects to view the property. In a block 32, a check is made to confirm automated entry is available for the selected property.

If automated entry is not available, in a block 38, the automated entry process is completed. Ending of the automated entry process may include, for example, displaying or making available to the user of portable device 12 contact information to a landlord, property manager, owner or real estate agent for the selected property. For example, auto-entry may be available only during specified hours (e.g., 8 AM to 6 PM Monday through Saturday). If the prospective buyer or renter requests to view at a time when the property is unavailable for viewing, the renter/buyer will be directed to return when the property is available for viewing. For example, a property manager or owner or other keeper of the property sets viewing hours which are stored in server 11.

If in block 32 it is confirmed that automated entry is available for the selected property, in a block 33 a request for payment is made. For example, a small fee may be charged for each entry made using automated entry. This charge can be made or authorized here or later in the automated entry process, or not at all in some implementations.

Figure 6:
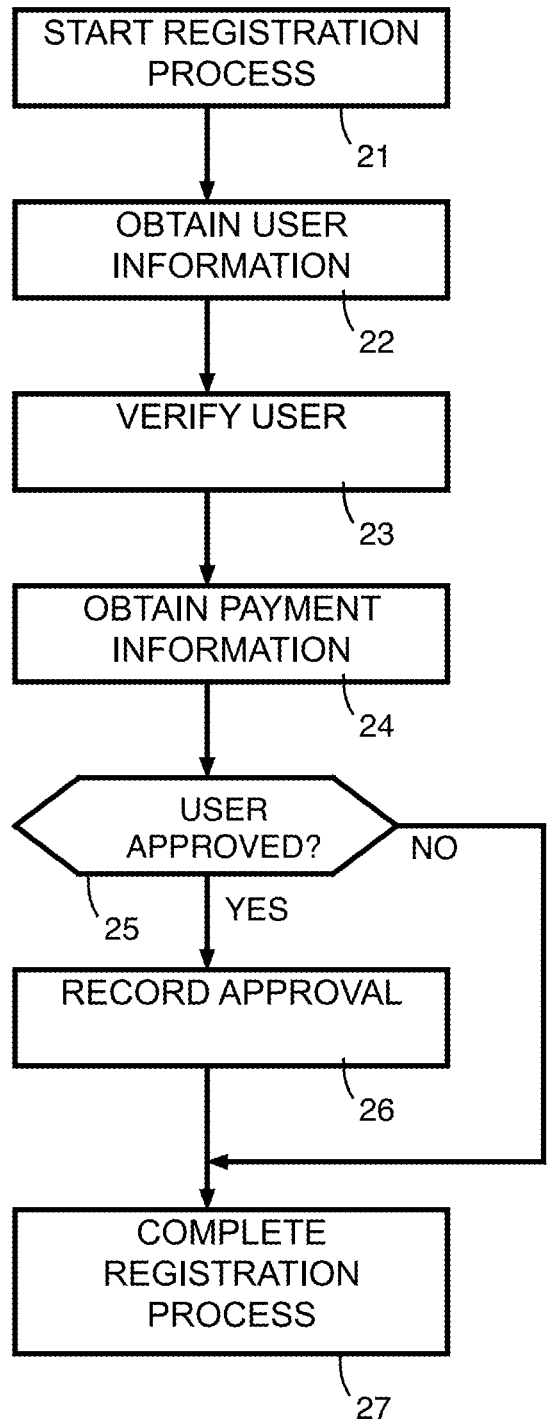
FIG. 6 is a simplified flowchart illustrating registration to use a system that provides automated entry to a property in accordance with an implementation.

In a block 34, a check is made to see whether payment has been made or authorized. Payment may be made, for example, in accordance with payment information received during the registration process illustrated in FIG. 6. If in block 34 it is determined that payment has not been made or authorized, in block 38, the automated entry process is completed.

If in block 34 it is determined that payment has been made or authorized, in a block 35 a location of the selected property is displayed. For example, the location of the selected property may be displayed along with an indication of the current location of portable device 12. The location of portable device 12 can be determined, for example, using a positioning system. The positioning system can include any suitable system such as, for example, a global positioning system ("GPS"), or another type of positioning system that utilizes a suitable triangulation technique to determine geographic coordinates of portable device 12. For example, such a triangulation technique can determine various measurements (e.g., signal-to-noise ratio ("SNR") or signal strength measurements) of, for example, a network signal (e.g., a cellular telephone network signal, a wireless network access point or "hot spot," or any other suitable network signal) associated with portable device 12 to perform triangulation.

In a block 36, a determination is made as to whether the location of portable device 12, for example, as determined above, is near to the location of the selected property. If portable device 12 is located within a predetermined distance of the selected property, in a block 37, portable device 12 grants automated access to the property to the user of portable device 12. The entry can be granted using lock box 15 or using any other means as described above in the discussion of FIG. 1 or by some other method such as, portable device 12 transmitting a signal using an appropriate protocol and radio (e.g., Bluetooth signal or other near field communication) to direct a door to be opened, or portable device 12 displaying a pattern for an optical reader associated with a door or simply displaying a code to open lock box 15 containing a key which can be used to unlock a door on the selected property.

For cases where a prospective renter or buyer does not have a smart phone, the property manager or owner or other keeper of the property can still provide for remote entry. For example, a number listed on a for sale or for rent sign can be dialed by the prospective renter or buyer. The property manager or owner or other keeper of the property or an assistant can obtain, for example, identification and credit card information over the phone, log the obtained information in a database for the property and issue a one-time pass code that will allow the prospective renter or buyer access to the property. In this way, a record of the visit to the property by the renter will be in the database and there is no need for the property manager or owner or other keeper of the property to travel to the property to let the prospective renter or buyer in to see the property.

For example, data and/or statistics about user of portable device 12 are collected by automated entry module and stored either locally on portable device 12 or remotely on server 11 or some other electronic device. Such data and statistics can include information such as the date and time the user of portable device 12 entered a property, the amount of time spent at the property, the amount of time required to process a rental application and so on. This provides listing agents, property managers, landlords, etc. with indications about why particular properties aren't being rented or sold. This also allows owners and property managers, etc., to accumulate detailed statistics on property activity such as, how many views, how many interests (click visit), how many unlocks and so on.

In one implementation, a property owner or manager or other keeper of the property can generate a one-time entry code manually in the portal. This is useful, for example, when after speaking with a potential renter over the phone, the property owner or manager or other keeper of the property desires to let the potential renter view the home without expending time and gas on a physical trip to the property.

The layers used—e.g., registration, gps, one-time code, etc.—allow for screening and increased security for the process by which prospective renters and buyers view properties.

For example, once a potential renter or buyer has selected a property to tour, additional nearby properties also available to tour may be presented to the user. In this case, it would not be necessary for a potential renter or buyer to begin the search process again in order to tour additional nearby properties.

For example, automated entry module 16 may be embodied in a computer program product that includes a non-transitory machine readable and/or usable medium. For example, such a computer usable medium may consist of a read-only memory device, such as a CD ROM disk or conventional ROM device, or a random-access memory, such as a hard drive device or a computer diskette, or flash memory device having a computer readable program code stored thereon.

Figure 8:
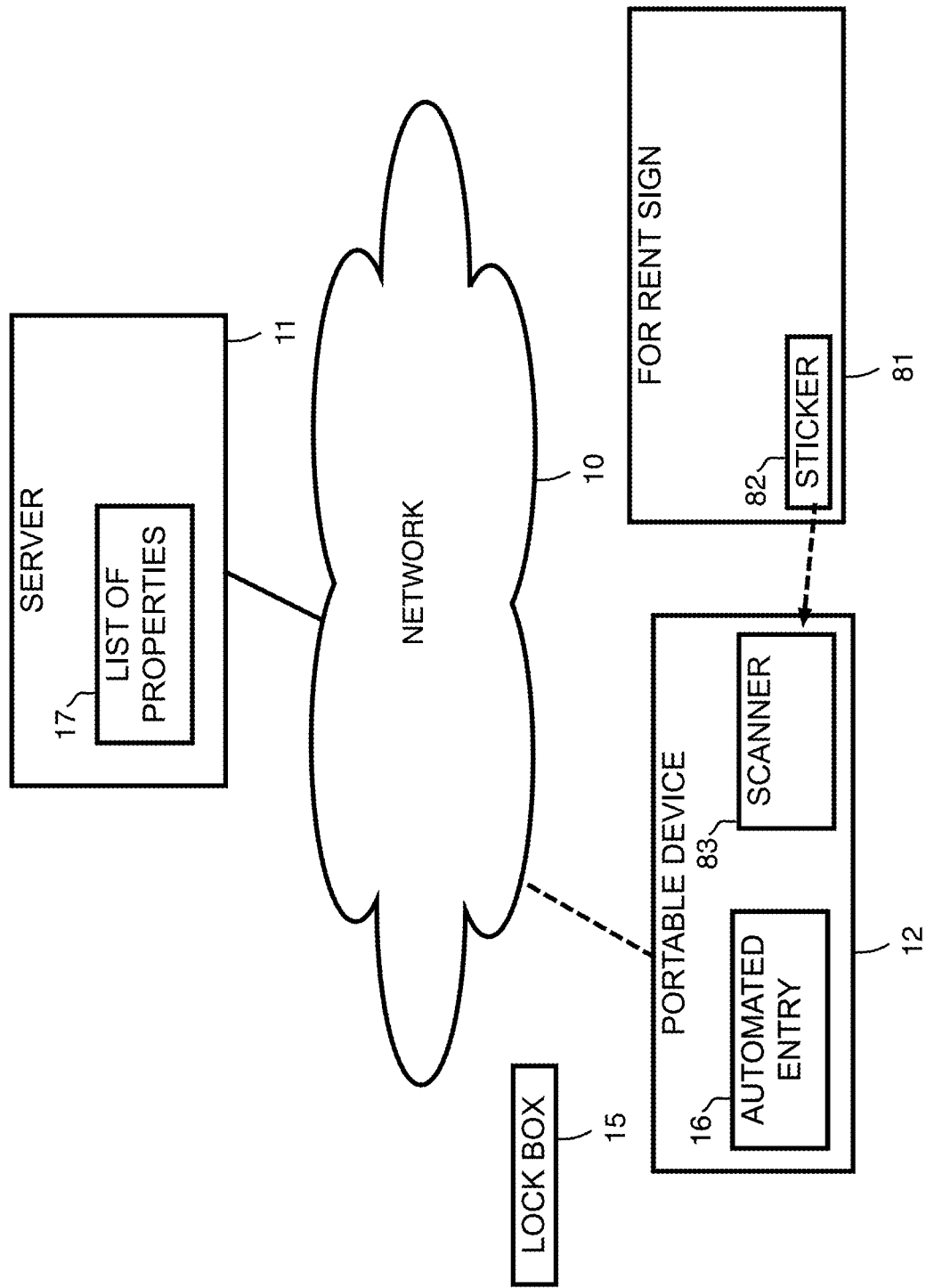
FIG. 8 is a simplified block diagram of the system shown in FIG. 1 illustrating use of a sticker on a sign to identify a property in accordance with an implementation.

FIG. 8 is a simplified block diagram of the system shown in FIG. 1 illustrating use of a sticker 82 placed on a sign 81 to identify a property. For example, sticker 82 includes a bar code or some other encoded or unencoded indicium that is an identifier of the property. Alternately, for example, sticker 82 is not present but the Identifier is placed directly on sign 81.

For example, when portable device 12 is equipped with a scanner 83, sticker 82 can be scanned to obtain the identifier. Alternately, the identifier can be obtained from sticker 82 by some other means. For example, the identifier could be a number that a user of portable device 12 reads and manually enters into portable device 12.

A query to a list of properties 17, stored, for example, in server 11 or portable device 12, can be used to obtain property detail, such as the additional information disclosed in the display shown in FIG. 4. For example, to take a tour of the property, including obtaining physical access to the property, a user of portable device can select a start tour now button 66, shown in FIG. 4. This allows a user of portable device 12 to instantly obtain information about a property, and instant access to the property, all from scanning an identifier on a sign located on the property.

For example, sticker 82 can include an identifier that is associated with lock box 15, so that sign 81 (or a new sign with sticker 82) and lock box 15 can simultaneously be easily moved together to a new property with minimal reconfiguration.

Figure 9:
FIG. 9 illustrates an interface used for inviting a prospect to visit a property in accordance with an implementation.

FIG. 9 illustrates an interface used for inviting a visitor (e.g., a prospective renter or buyer) to view a property. Such an invitation can be used to advertise an open house or to notify of the opportunity to view a property when it becomes available to view. The invitation can be initiated by a marketer of the property such as, for example, a property owner or a property manager. In an area 111, information about the visitor can be filled in and the invitation sent, for example, by text message, e-mail, instant messaging, or some other form of communication.

Figure 10:
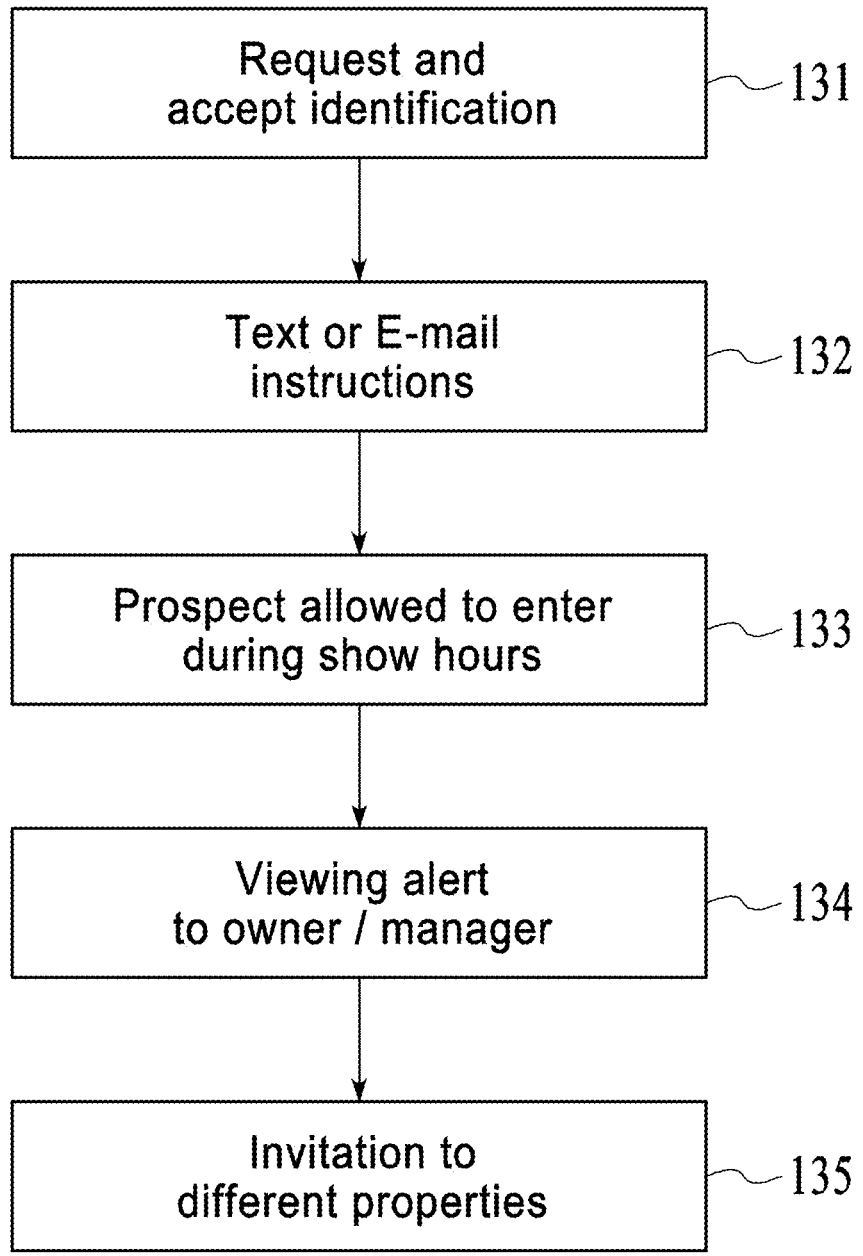
FIG. 10 is a simplified block diagram illustrating making a property available to a prospect as an open house in accordance with an implementation.

FIG. 10 is a simplified block diagram illustrating making a property available to a prospective renter or buyer (i.e., a visitor) as an open house when the visitor responds. In a block 131, the system requests and accepts identification from a visitor who wants to view a property. An interface for accepting information provided to the visitor is illustrated in FIG. 11.

In FIG. 11, a visitor can enter credit card information in an area 91 of an interface shown, for example, on a web page, mobile phone application or other interface available to the visitor. Alternatively, other identification can be used such as a driver's license, bank card, or so on.

In a block 132, shown in FIG. 10, in response to receiving identification, the visitor receives from server 11 a communication providing information on how to access the property. For example, the communication can be a text transmission, an e-mail, an instant message, or some other form of communication. For example, FIG. 12 shows an example of a text message 95 sent to a user that indicates a lock box code and a time of expiration. This information will be sufficient to allow the visitor to enter and tour the property.

In a block 133, shown in FIG. 10, the server 11 communicates with lockbox 15 to allow the visitor to enter during the specified time period and before the time of expiration. In a block 134, a viewing alert is sent to the owner or other manager of the property indicating the property has been viewed. For example, the viewing alert can be in the form of an e-mail, a text message, an instant message, or some other form of communication.

In a block 135, the visitor can be invited to view other properties. The communication can be in the form of an e-mail, a text message, an instant message, or some other form of communication. This makes all these other properties open for viewing by the visitor. Additionally, other communications, such as an invitation to complete a survey can be sent. For example, FIG. 12 shows a text message 96 sent to a visitor inviting the visitor to complete a survey.

Figure 13:
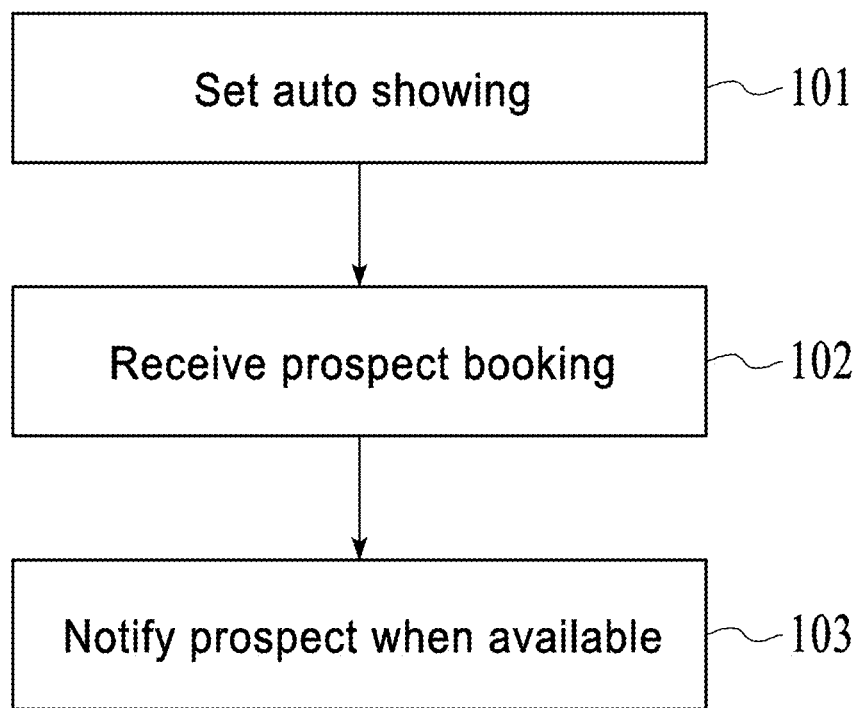
FIG. 13 is a simplified block diagram illustrating preleasing scheduling properties in accordance with an implementation.

FIG. 13 is a simplified block diagram illustrating preleasing scheduling of properties. This allows a visitor to express an interest in visiting a property before it is available for inspection. For example, a property may have renters that have given notice that they will not be renewing their lease. Viewing will not be allowed until the property is vacated and the property manager or owner has placed the property in condition for showing. The visitor may express an interest in viewing the property when it becomes available for showing. In a block 101, the property manager or owner sets up auto showing on a property currently not available for showing. This is done, for example, using an interface such as that shown in FIG. 14.

Figure 14:
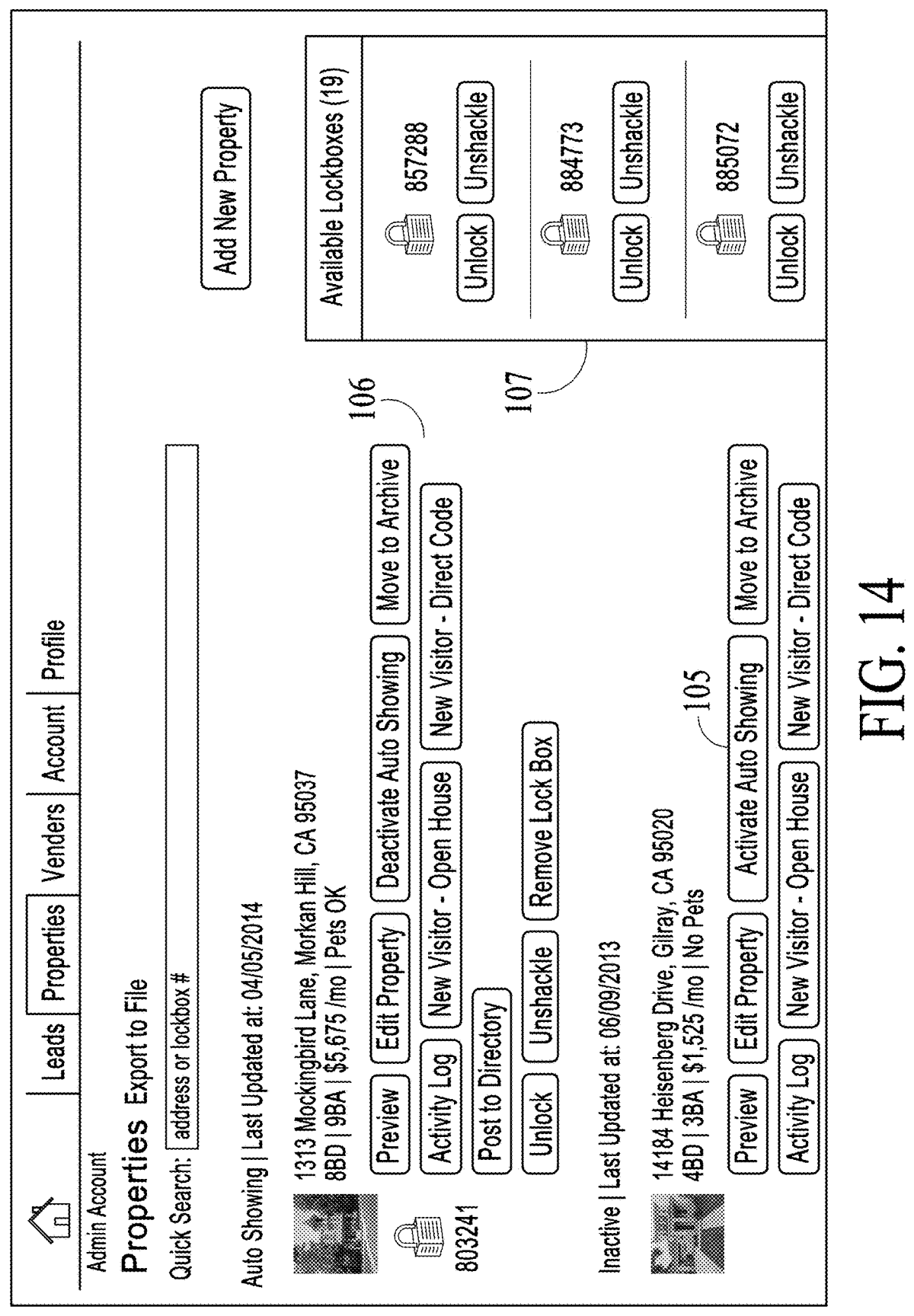

In FIG. 14, each property includes a selection that allows or disallows auto showing. For example, in an entry 105, a user has not yet activated auto showing, but can do so by selecting the button labeled activate auto showing. For example, in an entry 105, a user has activated auto showing, but can de-activate auto showing by selecting the button labeled deactivate auto showing. Area 107 sets out lockboxes available to be used by the owner for various properties.

In a block 102, shown in FIG. 13, if the visitor expresses interest in a property not currently available for showing, the interest is noted to be acted upon when the property comes available for showing.

In a block 103, the visitor is notified when the property is available for showing. For example, the notification can be by a text transmission, an e-mail, an instant message, or some other form of communication. For example, the communication can be similar to that set out in area 92 of FIG. 11.

The interface shown in FIG. 13 and FIG. 14 is part of a general scheduling feature. Using the interface, an agent can enable a property for schedule showings during certain time periods. The agent can also set customized pre-screening questions, and then enable a property for scheduling. If a visitor (e.g., a potential renter or buyer) submits a request to schedule a visit to the property, any agent in the system can claim the lead and the visitor will receive a reminder one day and one hour in advance. As long as the visitor confirms the visit, the agent will go and show the property.

Figure 15:
FIG. 15 illustrates an interface used for organizing leads in accordance with an implementation.

FIG. 15 illustrates an interface 150 used for organizing leads. A user of the system, i.e., an agent, can view leads claimed by the agent by selecting a tab 155, and can view unclaimed leads that are available to be claimed by the agent by selecting a tab 156. An administrator can additionally view all open leads, by selecting a tab 157, and can view closed leads, by selecting a tab 158.

Interface 150 in FIG. 15 shows an administrator view of open leads. An entry 151 shows an entry 151 that is unassigned, and thus available to be claimed by an agent. An entry 152, an entry 153 and an entry 154 have already been claimed by agents. A phone contact for the property, an assigned agent, a property status, last activity date and notes on the last activity are all displayed by interface 150. Interface 150 can be used to link data that pertains to a number of agent showings, visitor viewings, and time a property is on the market.

Figure 16:
FIG. 16 illustrates an interface that allows alerts to be sent to an agent in accordance with an implementation.

As illustrated by FIG. 16, once an agent has responsibility for a property, communications about the property can be routed to the agent. In FIG. 16, an interface 160 allows an administrator to indicate what communications will be forwarded to an agent. In an area 161, the agent for any property can be selected to receive one or more of the following types of communications: call by phone, SMS (text) messages, e-mail. In addition, check-in alerts can also be sent to an agent. In an area 161, the administrator can select for which properties communications will be sent to the agents for the properties. This alert feature allows property managers flexibility about how much communication an assigned agent receives about a property.

Figure 17:
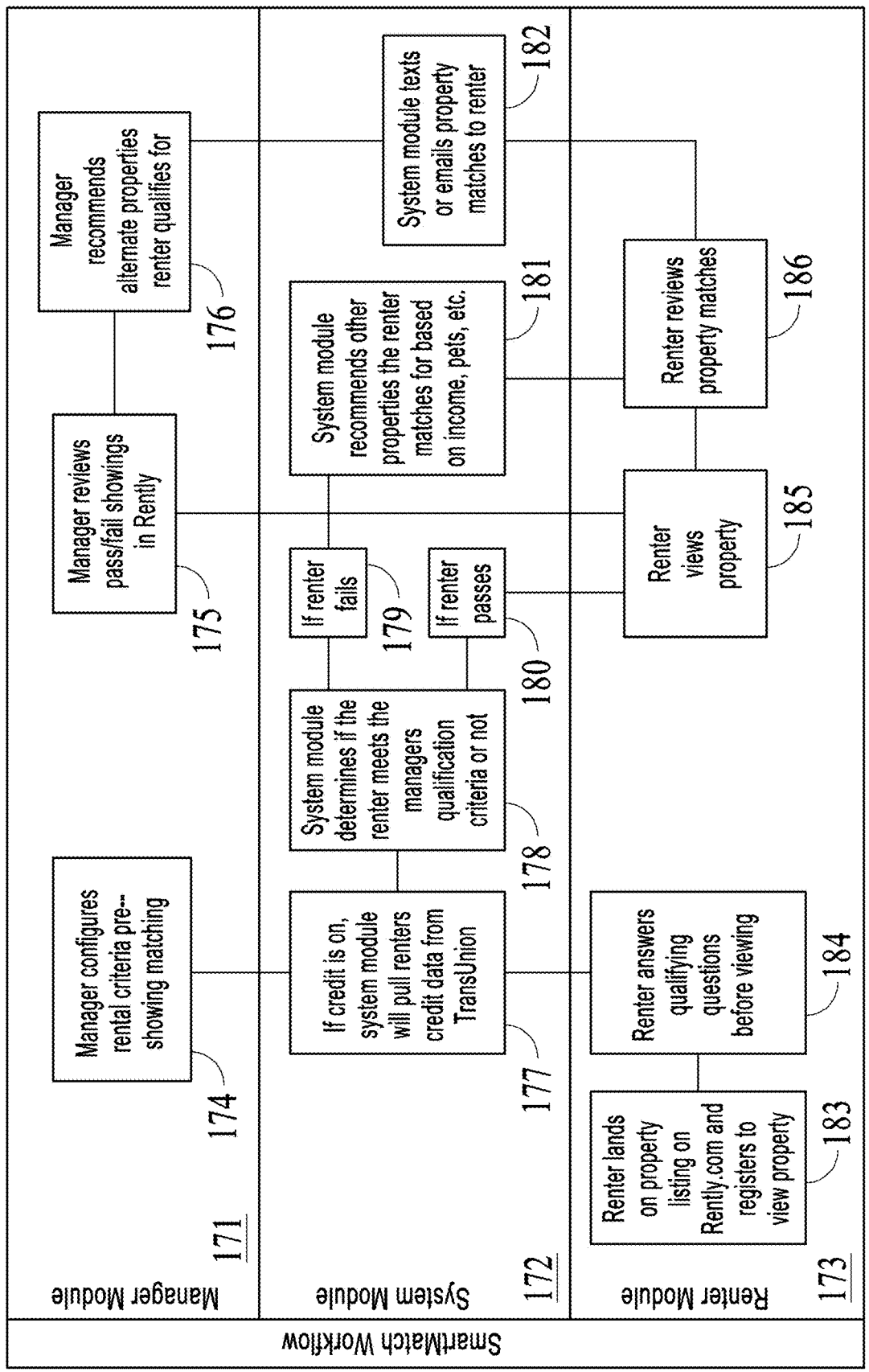
FIG. 17 is a simplified flowchart showing computer-assisted matching of renter to available properties for rent in accordance with an implementation.

FIG. 17 is a simplified flowchart showing computer-assisted matching of renter to available properties for rent. A renter module 173 within portable device 13 (shown in FIG. 1) or within a personal computer or server utilized by a potential renter of property to seek properties to rent. A manager module 171 within manager computing device 16 (shown in FIG. 1) or within a server is utilized by a property manager to manage properties available for rent. A system module 172 within server 11 (shown in FIG. 1) interacts with renter module 173 and manager module 171 to match potential renters to properties available for rent. Here below property manager is used to mean any person that manages property for rent. A property manager may be for example, the owner of the property, a real estate agent or other person charged with managing or listing (e.g., a listing agent) a rental property, or any other person under the employ of such an owner or real estate agent or other person that manages property for rent.

In a block 174, manager module 171 receives property manager input from a property manager that is renting a property. The property manager input pertains to rental criteria for the property.

In a block 183, renter module 173 receives a renter registration of a potential renter that would like to view the property. In a block 184, renter module 173 receives from the potential renter answers to qualification questions. For example, FIG. 19 shows an interactive window interface 199 controlled by renter module 173. The questions asked as shown in FIG. 19 represent typical information the potential renter is requested to answer.

In a block 177 shown in FIG. 17, system module 172 electronically requests and obtains credit information pertaining to the potential renter through a credit bureau such as TransUnion credit bureau, some other credit bureau or some other source of credit information. System module 172 also receives from manager module 171 rental criteria for the property the potential renter would like to view. In a block 178, system module 172 determines, based on information obtained from renter module 173 and the credit information from the credit bureau, whether the potential renter meets the rental criteria for the property as received by manager module 171 from manager module 171.

In a block 180, when the potential renter meets the rental criteria, the system module communicates to renter module 173 allowing, in a block 185, the renter to view the property. In a block 175, manager module 171 reviews pass/fail showings that include showings allowed by system module 172 and that includes showings not allowed by system module 172 because the potential renter failed to meet the rental criteria for the property.

For example, FIG. 20 shows a window 200 displayed to a property manager by manager module 171. For each property, the property manager is shown such information as a move in date, a name, contact information, viewing date and other tracked information about potential renters of the property. For example, in a match column, a green dot indicates the potential renter is qualified to view the property, while a red dot indicates the potential renter is not qualified to view the property.

Figures 21, 22, 23:
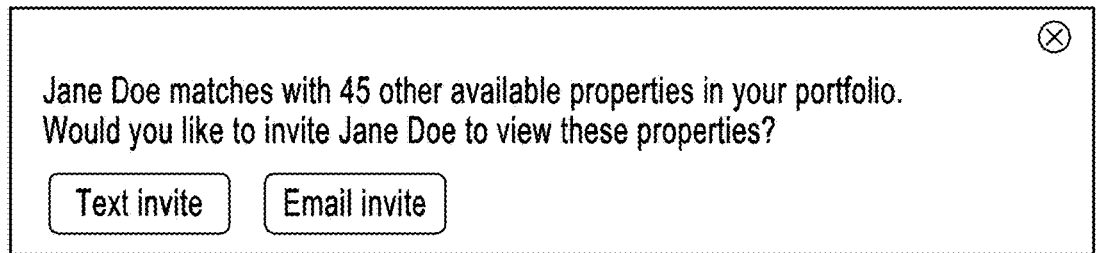

In a block 176 shown in FIG. 17, manager module 171, either automatically or in response to input from a property manager, finds other properties that can be recommend to the potential renter and for which the potential renter meets the rental criteria for the property. These other properties are sent to system module 172. For example, FIG. 21 shows a pop-up window interface 210 that manager module 171 displays to a property manager allowing the property manager to send a message to a potential renter inviting the potential renter to view other properties. The pop-up window interface 210 identifies the number of properties that are a match for a potential renter and allows the property manager to instruct the system send a link to each of these properties to the potential renter. For example, if the potential renter applied with one or more other applicants, the system will allow the other applicants to also receive links to properties they qualify for.

In a block 182 shown in FIG. 17, system module 172 communicates to the potential renter, for example, via SMS text message, electronic mail, or some other messaging or communication system, to inform the potential renter of the properties for which the potential renter meets the rental criteria for the property. In a block 186, renter module 173 allows the potential renter to review available property for which the potential renter is qualified to view. In block 185, the renter module 173 allows the potential renter to view a selected property. For example, the potential renter views the property In a block 179, when the potential renter fails to meet the rental criteria to view the property, system module 172, in a block 181, reviews the information obtained from renter module 173 and the credit information from the credit bureau to determine what other properties are available for rent for which the potential renter meets the rental criteria. These property matches are sent to renter module 173. In block 186, renter module 173 allows the potential renter to review available property for which the potential renter is qualified to view. In a block 185, the renter module 173 allows the potential renter to view a selected property. For example, the viewing process is as described above where the automated entry information is provided to the potential renter that allows the potential renter to enter the property. For example, the automated entry information includes code information that is valid during a specified period of time. The automated entry information is provided automatically to the potential renter without the potential renter request requiring approval by any human decision maker. For example, the entry information is used to open a lock box or an automated door lock at or near a property. When the potential renter provides the code information to the lock box or automated door lock within the specified period of time, the lock box or automated door lock opens to facilitate automated entry to the property. Alternatively, the entry information is entered into a short-range wireless enabled device within the specified period of time to enable the short-range wireless enabled device to provide an open signal to a short-range wireless enabled lock box or a short-range wireless enabled automated door lock using a short-range wireless interconnection, such as the Bluetooth short-range wireless interconnection.

Figure 18:
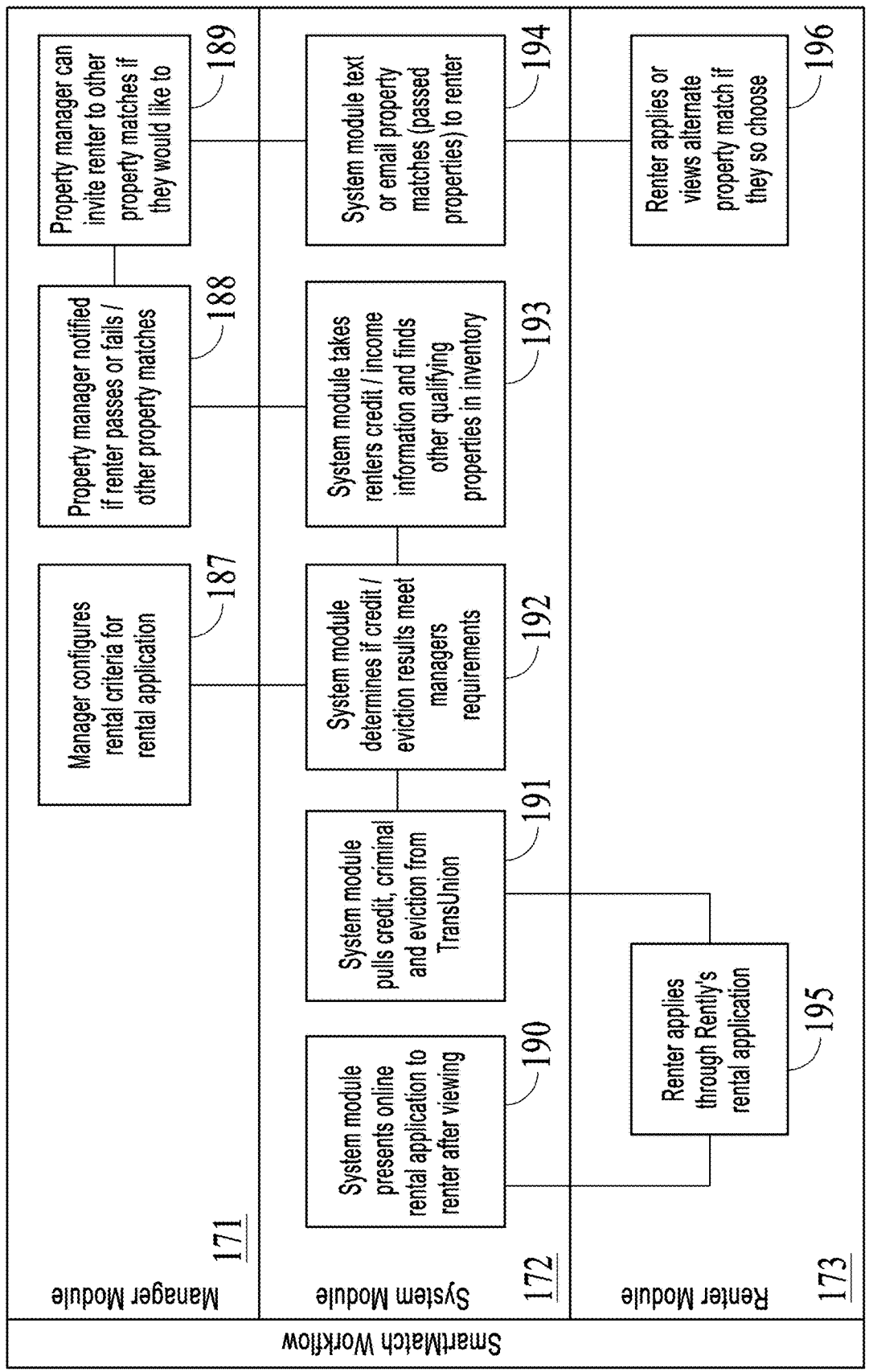
FIG. 18 is a simplified flowchart illustrating a computer-assisted rental process in accordance with an implementation.

FIG. 18 is a simplified flowchart illustrating a computer-assisted rental application process in accordance with an implementation. In a block 187, manager module 171 receives from a property manager, rental criteria for a rental application for the property. For example, FIG. 22 shows a sample interface manager that includes an area 220 where the property manager can set credit score ranges for which the application will be automatically denied, for which the application will be conditionally accepted and for which the application will be automatically accepted. An area 221 allows the property managers to add conditions for acceptance. For example, as illustrated in area 230 of FIG. 23, each conditional statement has three pull-down menus. For example, pull down menu 231 has the options: "Rent", "Income", "Deposit" and "agent approval". For example, pull down menu 232 has the options: "1×", "1.5×", "2×", "2.5×", "3×", "3.5×", "4×", "4.5×", "5×", "5×" and "6×". For example, pull down menu 233 has the options: "Rent", "Income", "Deposit" and "agent approval". For example, this allows conditions such as: If "Income" equals "3×" "Rent". Other such conditional statements can be included where the computer implemented memory module allows the property manager to modify criteria for conditional statements.

For example, FIG. 25 shows an entry area 250 where a property manager can enter detail information about the rental unit such as the number of bedrooms the number of bathrooms, unit square footage, the rent per month and the required deposit.

For example, FIG. 26 shows an entry area 260 where a property manager can specify past due account information that will result in denial of an application, conditional acceptance and approval, as well as a past due amount threshold. For example, the property manager can exclude certain types of debt such as medical debt and student loan debt, etc. For example, a past due amount threshold indicates a threshold below which past due amounts are not counted as a past due account. Manager module 171 is configured to receive a first range of values that indicates approval, a second range of values that indicates denial and a third value range that indicates conditionally conditional approval based on other factors.

For example, FIG. 27 shows an entry area 270 where a property manager can specify repossession information that will result in denial of an application, conditional acceptance and approval, as well as a past due amount threshold. For example, a property manager can elect to exclude mortgage foreclosures. Manager module 171 is configured to receive a first range of values that indicates approval, a second range of values that indicates denial and a third value range that indicates conditionally conditional approval based on other factors.

Figure 28:
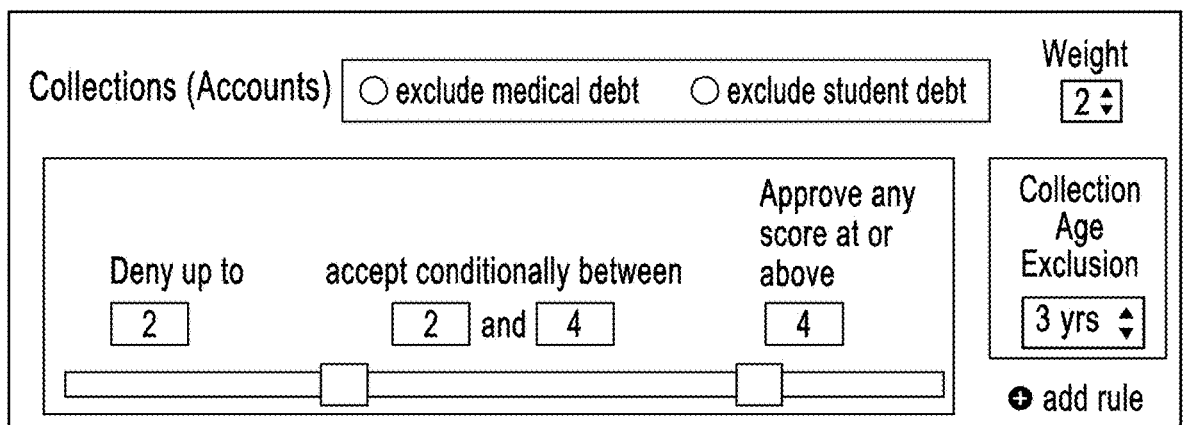

For example, FIG. 28 shows an entry area 280 where a property manager can specify collection accounts information that will result in denial of an application, conditional acceptance and approval, as well as a past due amount threshold. For example, the property manager can exclude certain types of debt such as medical debt and student loan debt, etc. For example, a collection age threshold indicates a threshold beyond which collection accounts are not counted as a past due account. Manager module 171 is configured to receive a first range of values that indicates approval, a second range of values that indicates denial and a third value range that indicates conditionally conditional approval based on other factors.

Figure 29:
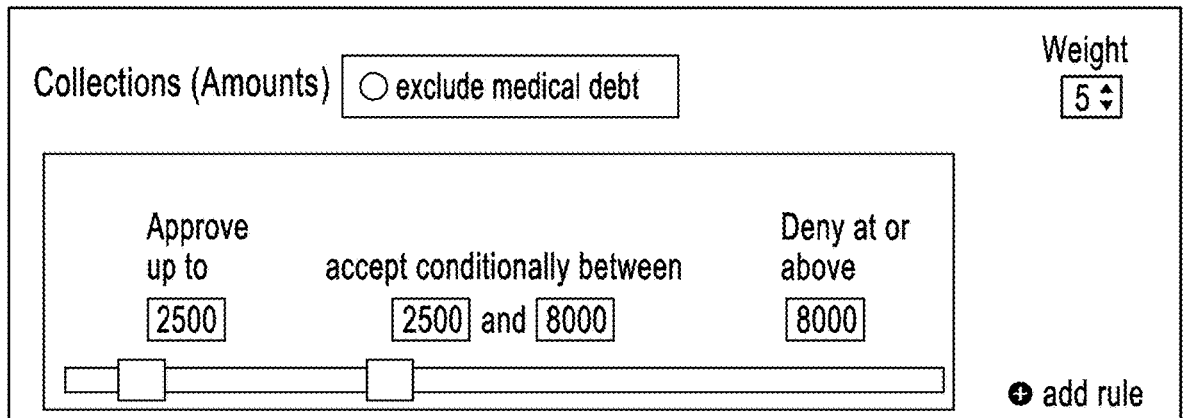

For example, FIG. 29 shows an entry area 290 where a property manager can specify collection amounts information that will result in denial of an application, conditional acceptance and approval, as well as a past due amount threshold. Manager module 171 is configured to receive a first range of values that indicates approval, a second range of values that indicates denial and a third value range that indicates conditionally conditional approval based on other factors.

Figure 30:
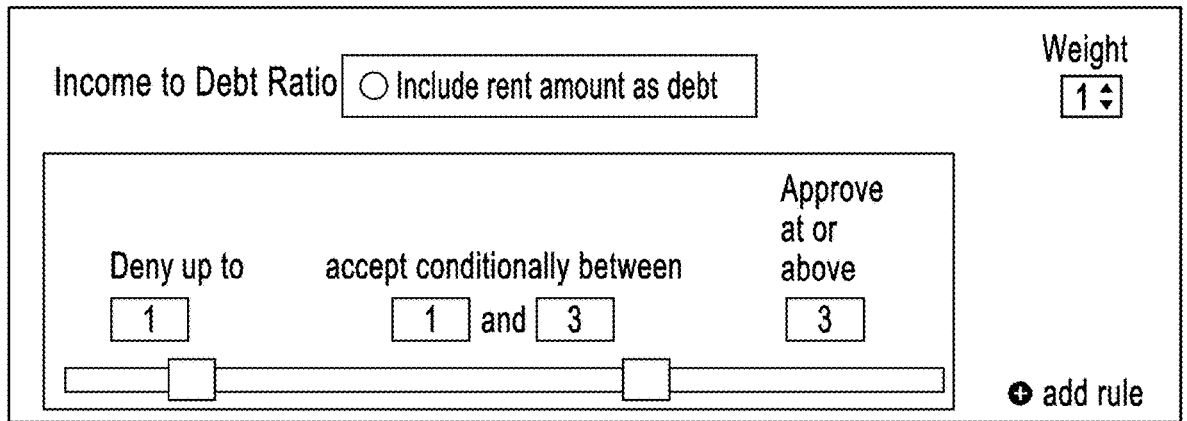

For example, FIG. 30 shows an entry area 300 where a property manager can specify a potential renter income to debt ratio that will result in denial of an application, conditional acceptance and approval, as well as a past due amount threshold. Manager module 171 is configured to receive a first range of values that indicates approval, a second range of values that indicates denial and a third value range that indicates conditionally conditional approval based on other factors.

Figure 24:

In a block 190, server module 172 presents an online rental application for a property to a potential renter after the potential renter has viewed the property. For example, FIG. 24 shows a window 240 of a part of an online application filled out by a potential renter. The window 240 includes entries where the potential renter indicates the income the potential renter receives. In a block 195, renter module 173 receives the input to the rental application from the potential renter. In a block 191, server module 172 requests and obtains credit information, criminal history information and eviction information pertaining to the potential renter through a credit bureau such as TransUnion credit bureau and/or some other information source. In a block 192, server module 172 compares credit information, criminal history information and eviction information pertaining to the potential renter with requirements of the rental criteria received from manager module 171.

In a block 193, system module 172 uses credit information, criminal history information and eviction information from the potential renter to find other properties the potential renter is qualified to rent. In a block 188, manager module 171 receives notification from server module 172 whether the credit information, criminal history information and eviction information pertaining to the potential renter meet requirements of the rental criteria received from manager module 171. If the requirements are met, the property manager is informed and the property manager has the option to approve the application for renting the property. The property manager is also informed of the other properties the potential renter is qualified to rent.

In a block 189, manager module 171 allows the property manager to invite the potential renter to consider the other identified properties the potential renter is qualified to rent. In a block 194, system module 172 communicates to the potential renter, for example, via SMS text message, electronic mail, or some other messaging or communication system, to invite the potential renter to view the identified properties. In a block 196, renter module 173 allows the potential renter to view or apply for the other identified properties the potential renter is qualified to rent.

Figure 31:
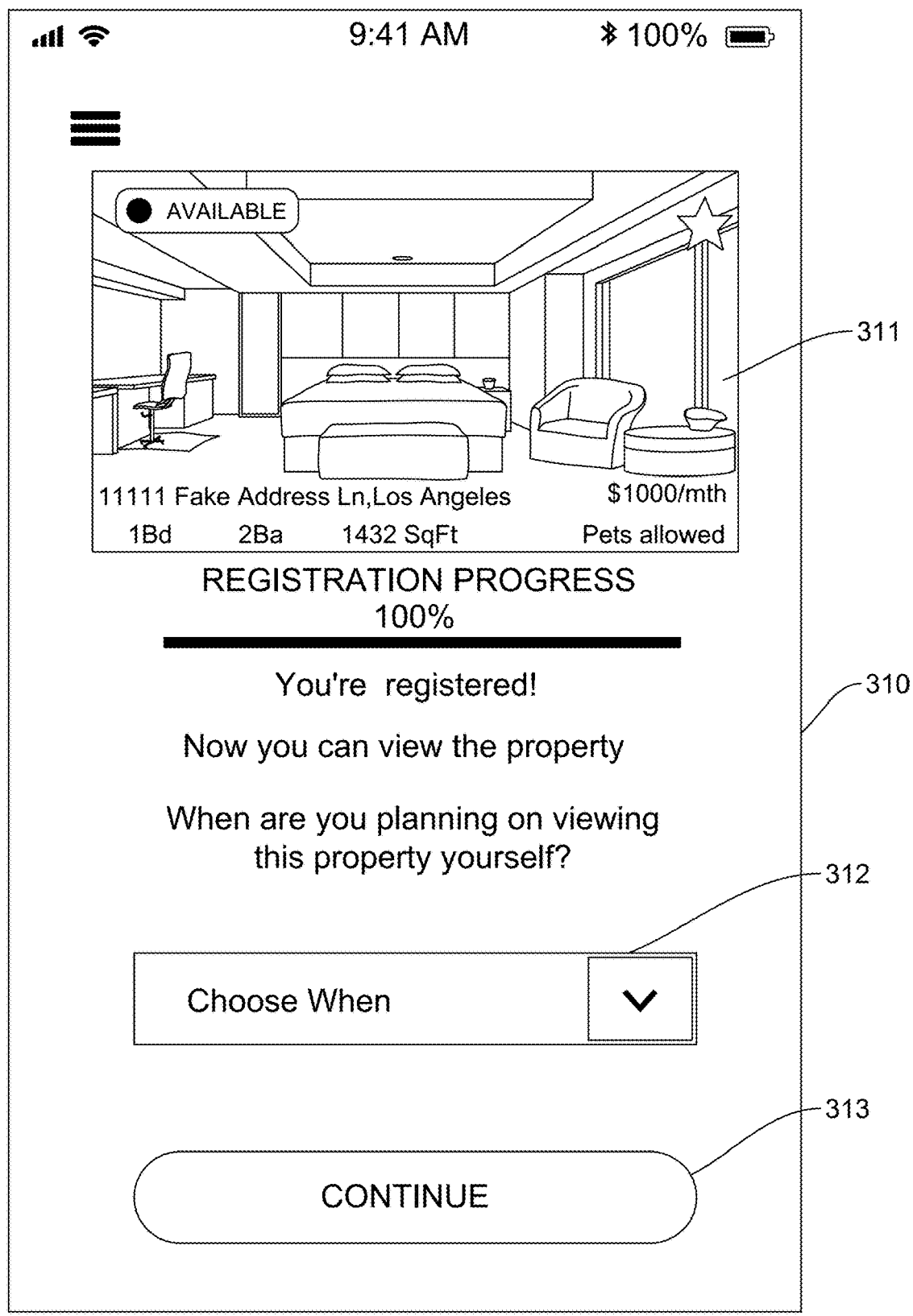

FIGS. 31 through 38 are screenshots illustrating how a prospective renter or purchaser of a property is coached through an automated showing of the property. FIG. 31 shows a screenshot 310 on a smart phone, tablet computing device, portable device or another type of computing device. Screenshot 310 indicates completion of the registration process to view a property. In a display area 311, information about the property is displayed. In a display area 312, a user can select the "Choose When" option to schedule a time to view the property. A button 313 allows the user to proceed to a next screenshot of an interface.

Figure 32:
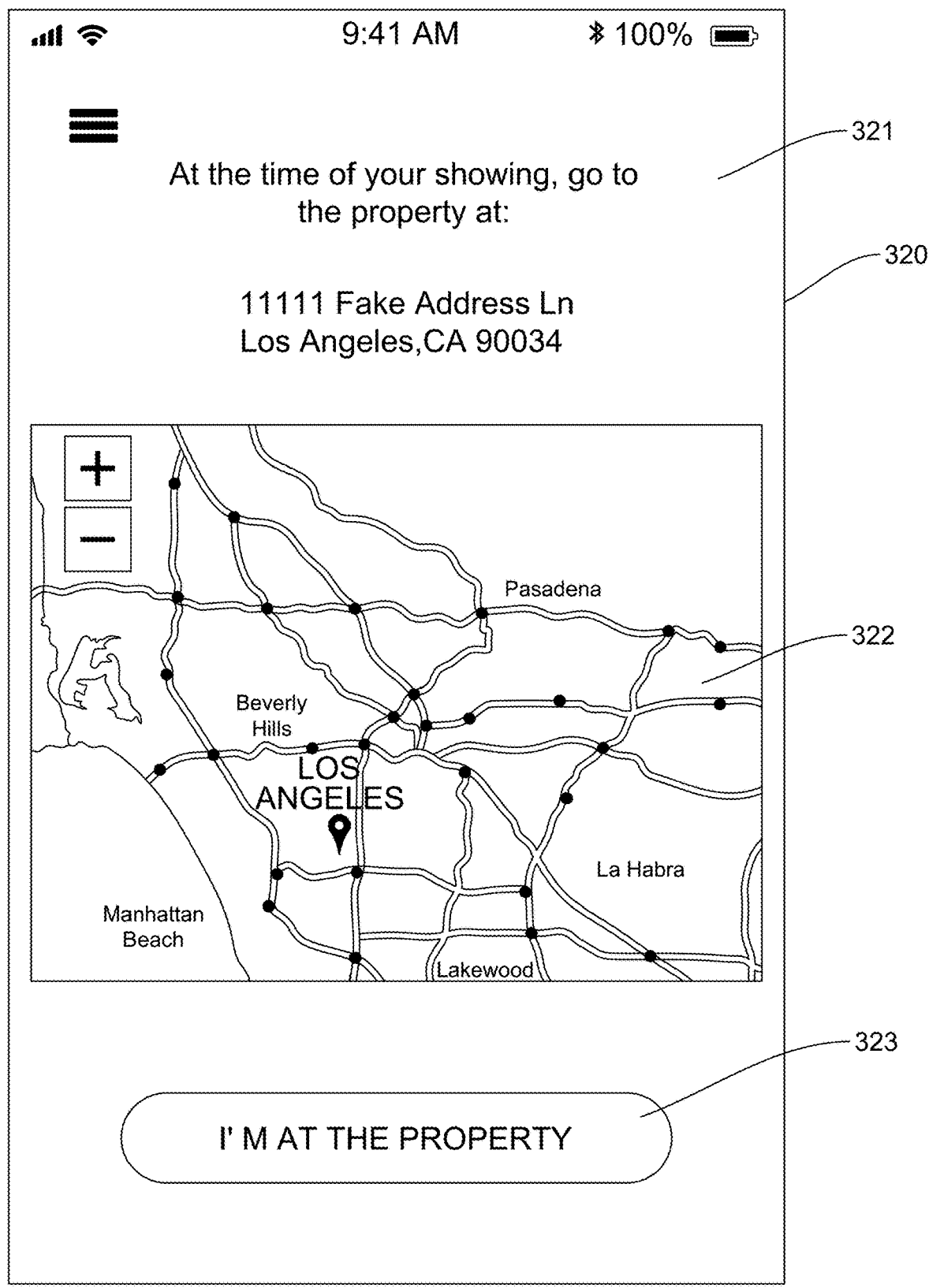

FIG. 32 shows a screenshot 320 that provides a map to a property where a showing will occur. In a display area 321, the address property is given. In a display area 322, a map to the property is shown. A user may select button 323 when the user is at the property.

Figure 33:
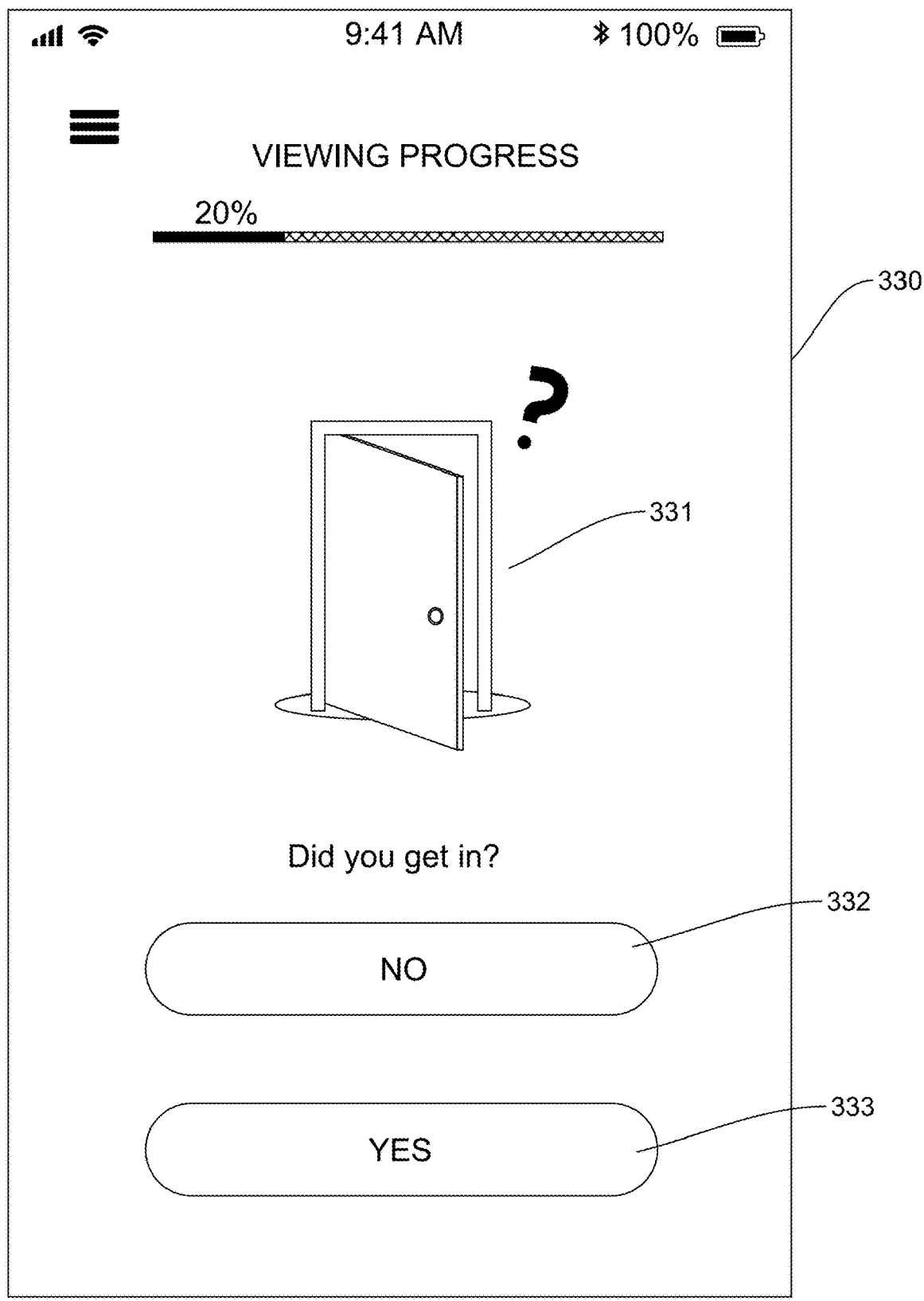

FIG. 33 shows a screen shot 330 that is shown to a user when the user is at the property location. An icon or other information is shown in a display area 331. A user can select a "YES" button 333 to indicate that the user has already gained entry to view the property. The user can select a "NO" button 332 to indicate that the user has not yet gained entry to view the property.

Figure 34:
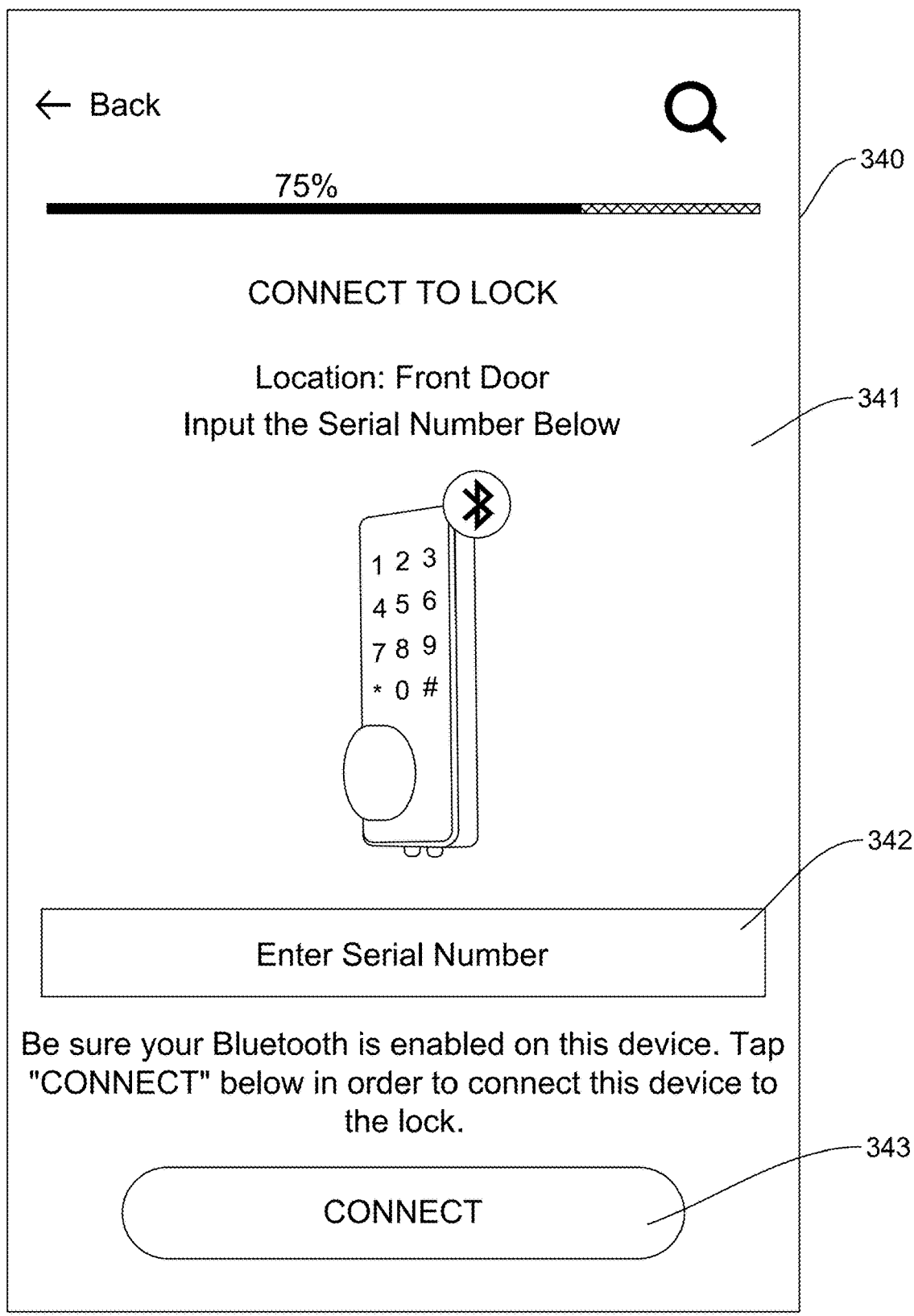

FIG. 34 shows a screen shot 340 that includes a display area 341 that indicates a location of a short-range wireless enabled lock box or a short-range wireless enabled door lock. For example, the short-range wireless interconnection used is a Bluetooth short-range wireless interconnection or another short-range wireless interconnection that can be used to communicate to an appropriately enabled lock box or door lock. A location 342 is a location where a user can enter an identifying number, such as a serial number, of the short-range wireless enabled lock box or the short-range wireless enabled door lock. This is typically found written on the short-range wireless enabled lock box or the short-range wireless enabled door lock. Alternatively, the smart phone or other short-range wireless enabled device can obtain this information through a short-range wireless interconnection between the short-range wireless enabled device and the short-range wireless enabled lock box or the short-range wireless enabled door lock.

A connect button 343 can be selected by the user when the user is ready to connect to the short-range wireless enabled lock box in order to open the lock box to obtain a key, or to connect to the short-range wireless enabled door lock to unlock the door for entry to the property.

For example, a user pin or other additional code may be additionally required for access.

For example, a property specific authorization code is sent to the user's short-range wireless enabled device when the user is authorized to enter the property. For example, the authorization is valid only during a specific period of time. In addition, for example, additional user identification information may be required before the short-range wireless enabled device facilitates opening the lock box to obtain a key, or to connect to the short-range wireless enabled door lock to unlock the door for entry to the property. The user identification information may be, for example, a passcode, a pin, a user phone number, or some other identifying information.

Figure 35:
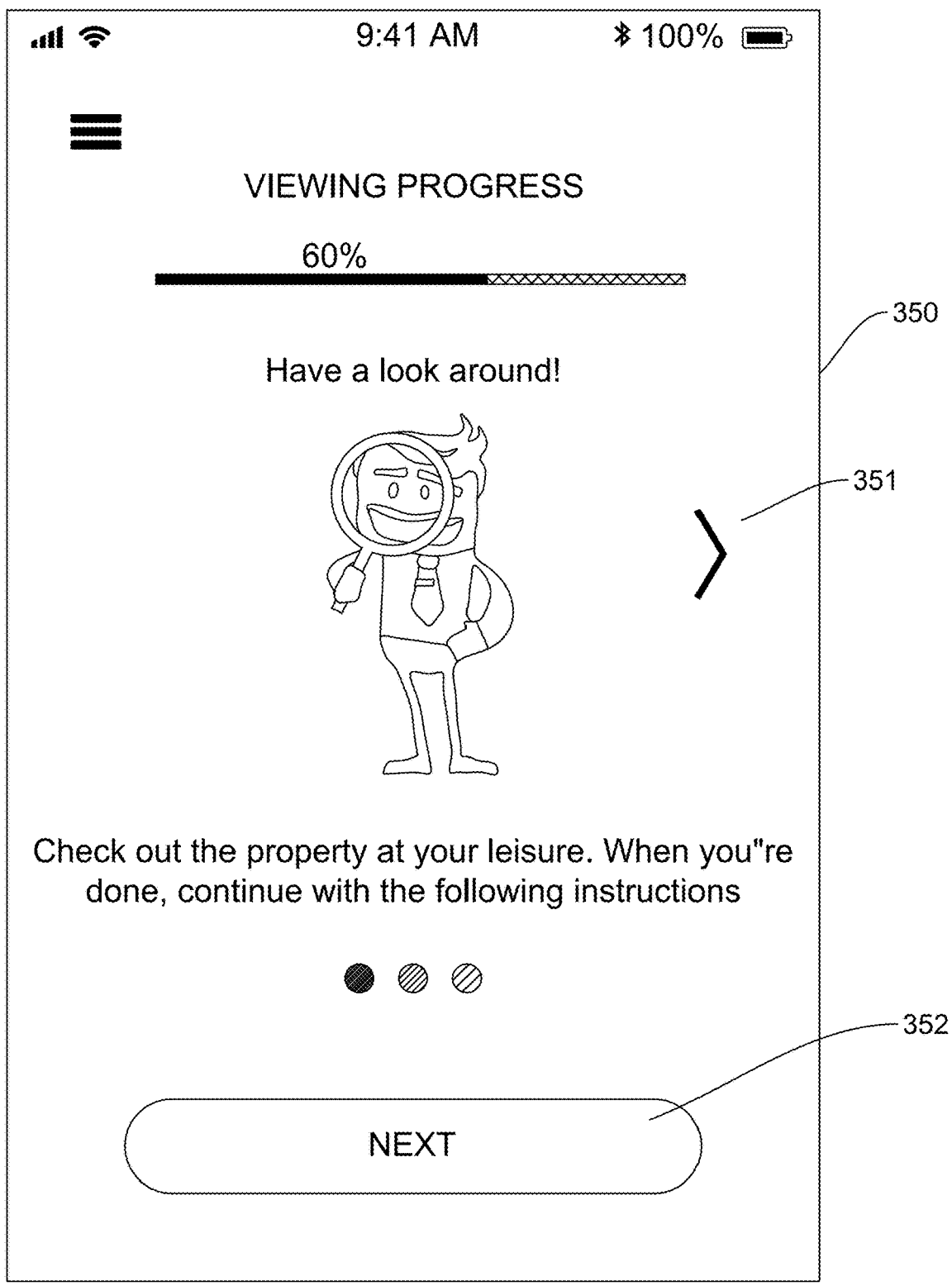

FIG. 35 shows a screen shot 350 that appears after the identification code is sent through the Bluetooth protocol to the short-range wireless enabled lock box or the short-range wireless enabled door lock to open the short-range wireless enabled lock box or the short-range wireless enabled door lock. In a display area 351, any general or special instructions or permissions concerning viewing the property are provided. A button 352 is selected to view a next viewing screen.

Figure 36:
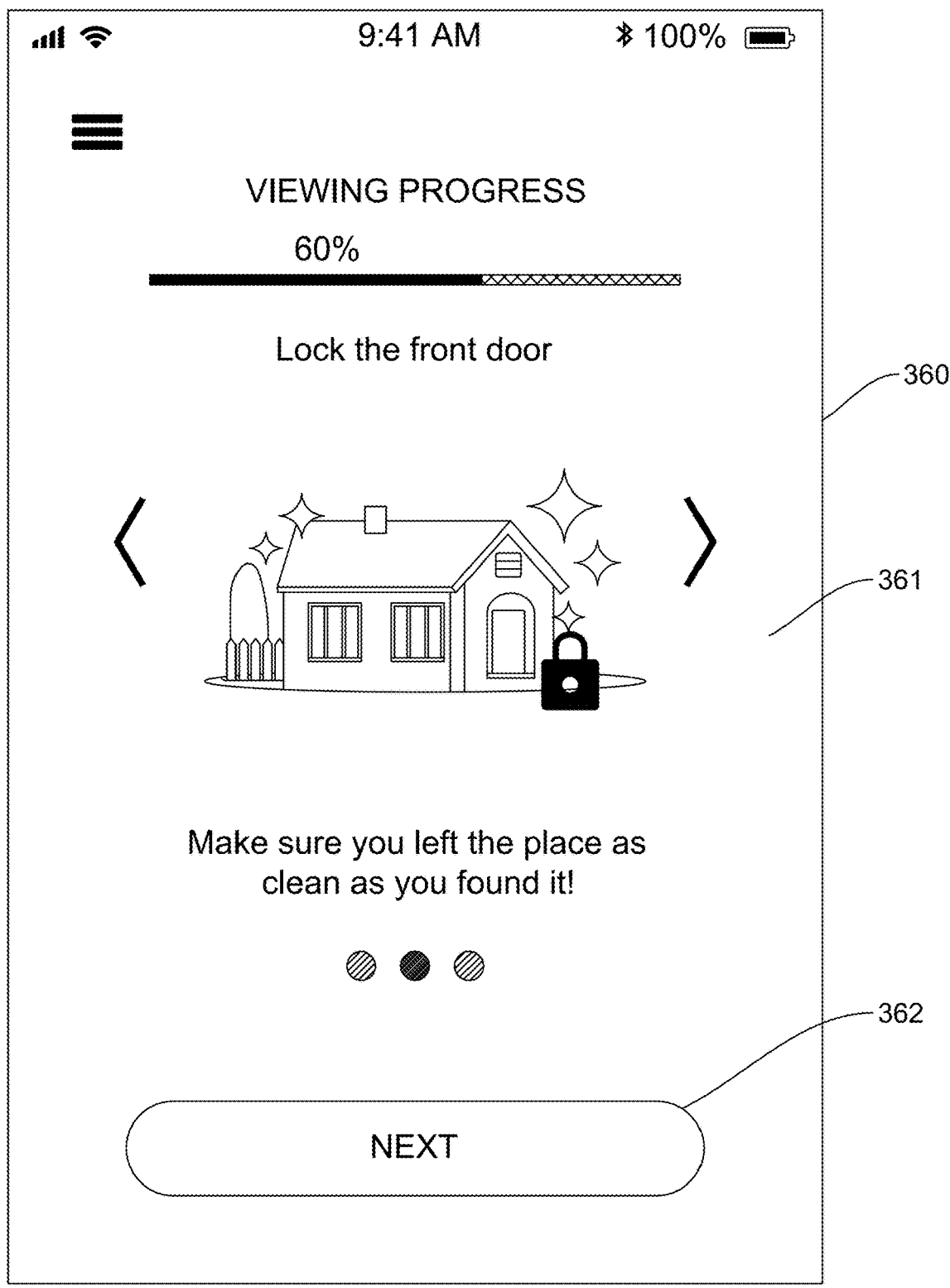

FIG. 36 shows a screen shot 360 that appears after button 352 is selected. In a display area 361, any general or special instructions or permissions concerning closing the property are provided. A button 362 is selected to view a next viewing screen.

FIG. 37 shows a screen shot 370 that optionally appears after button 362 is selected, or at some later time. In a display area 371 and in a display area 372, the user is invited to answer survey questions or to provide additional information or feedback about the property or about the experience viewing the property. A button 373 is used to submit the survey.

Figure 38:
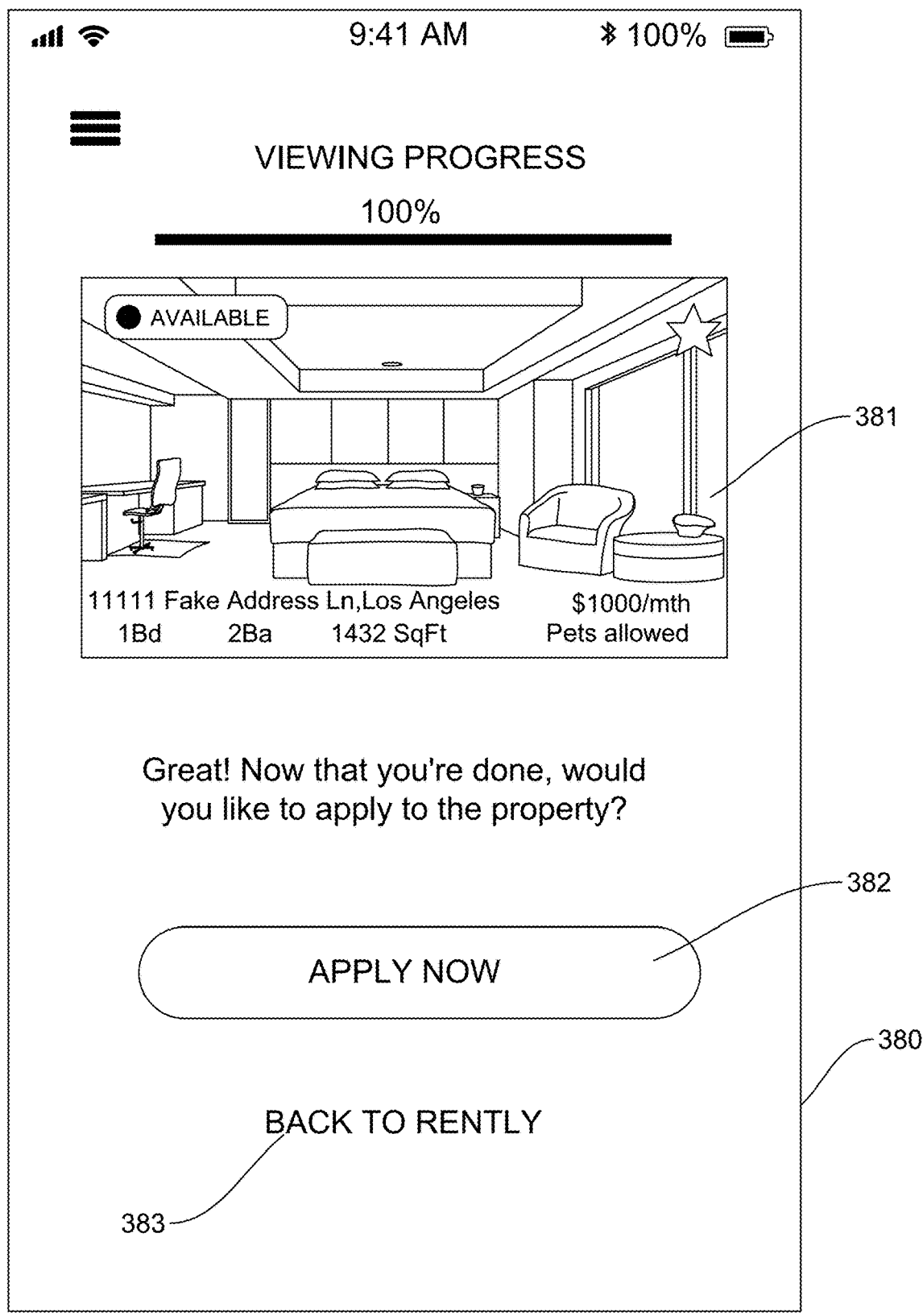

FIG. 38 shows a screen shot 380 that optionally appears after button 372 is selected, after button 362 is selected, or at some later time. In a display area 381, information about the property is displayed. A user may select button 382 to bring up an application for the property. A user may select button 383 to return to another menu provided by the automated entry system.

Figure 39:
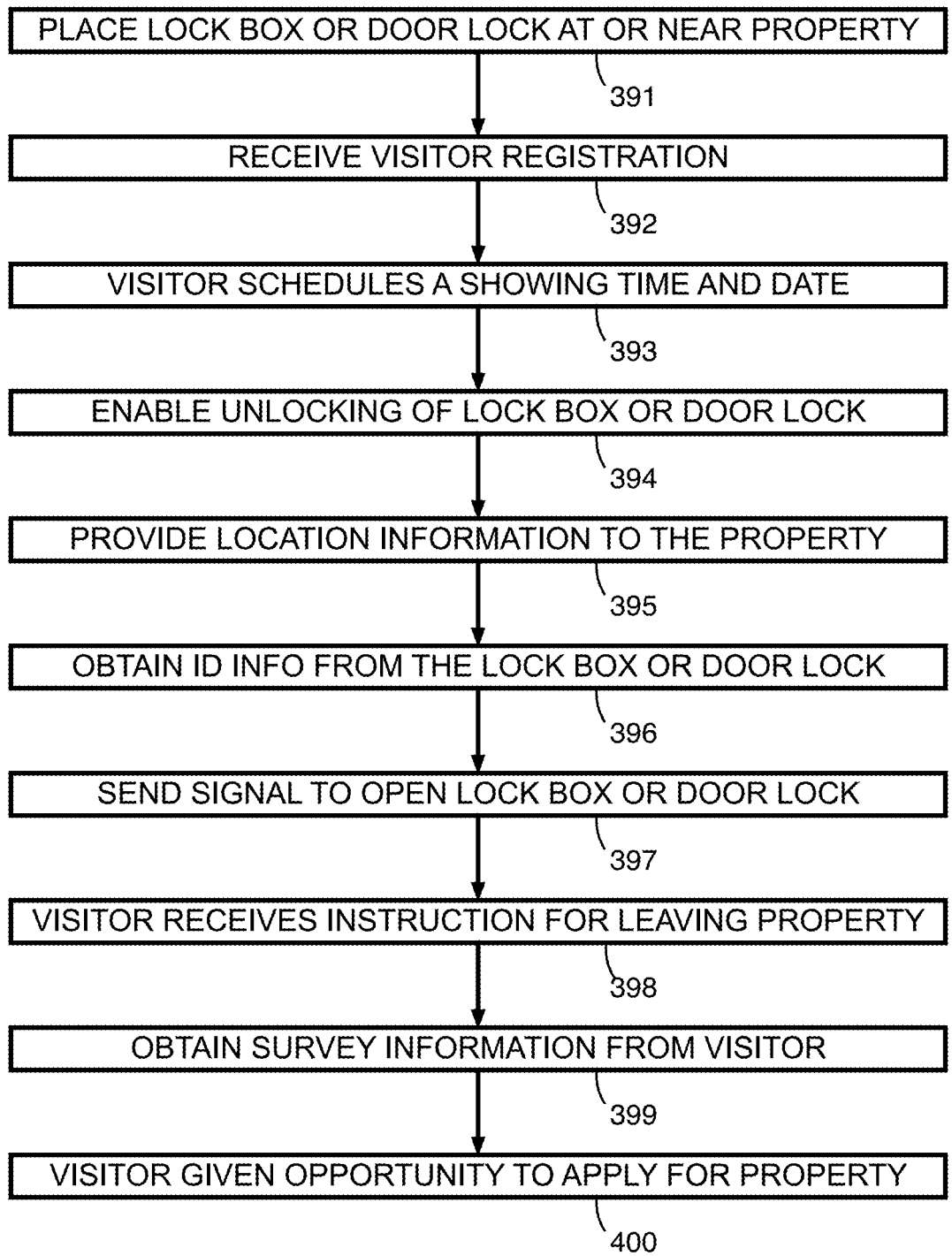
FIG. 39 is a simplified flowchart that illustrate an automated showing for a property in accordance with an implementation.

FIG. 39 is a simplified flowchart of the process illustrated in FIGS. 31 through 38. In a block 391, a lock box or a door lock is placed at or near a property. For example, the lock box or the door lock is a short-range wireless enabled lock box or door lock. In a block 392, an automated entry application running on a short-range wireless enabled device receives registration information from a visitor who desires to use the automated system for visiting properties. The registration information includes identification of the visitor.

In a block 393, the automated entry application allows the visitor to schedule an automated showing of the property at a visitor selected time and date. In a block 394, a central property application running on a server enables the visitor to unlock the short-range wireless enabled lock box or the short-range wireless enabled automated door lock at the visitor selected time and date. This is done, for example, by sending to the automated entry application running on the short-range wireless enabled device an authorization for the visitor to unlock the short-range wireless enabled lock box or the short-range wireless enabled automated door lock at the visitor selected time and date. Alternatively, or in addition, the short-range wireless enabled lock box or the short-range wireless enabled automated door lock can be programmed to allow the visitor to unlock the short-range wireless enabled lock box or the short-range wireless enabled automated door lock at the visitor selected time and date.

In a block 395, the short-range wireless enabled device provides to the visitor location information pertaining to the property.

In a block 396, the short-range wireless enabled device obtains an identifying number of the short-range wireless enabled lock box or the short-range wireless enabled automated door lock. This is done, for example, by the visitor entering the identifying number through an interface of the short-range wireless enabled device. Alternatively, this is done, for example, via a short-range wireless enabled connection between the short-range wireless enabled device and the short-range wireless enabled lock box or the short-range wireless enabled automated door lock. For example, identifying number is a serial number of the short-range wireless enabled lock box or the short-range wireless enabled automated door lock.

In a block 397, the short-range wireless enabled device sends a wireless signal to the short-range wireless enabled lock box or the short-range wireless enabled automated door lock to unlock the short-range wireless enabled lock box or the short-range wireless enabled automated door lock. In a block 398, the visitor is provided with instructions for leaving the property, including a reminder to lock up.

In a block 399, the short-range wireless enabled device obtains from the visitor survey information pertaining to visitor interest in the property. In a block 400, the automated entry application provides the visitor an opportunity to apply to rent the property.

The foregoing discussion discloses and describes merely exemplary methods and implementations. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. An automated entry system for providing automated entry to properties, comprising:
   an automated entry application running on a portable device, the automated entry application including an interface that allows a visitor to:
      access a listing of a property available for rent,
      provide qualification information about qualifications of the visitor to rent the property, the qualification information including information about income of the visitor and information about ownership of pets, and
      tour the property only if the visitor is determined to be qualified to rent the property;
   a central property application running on a server available over a network, wherein the automated entry application communicates with the central property application over the network, and wherein the central property application in response to the visitor providing qualification information about qualifications of the visitor to rent the property:
      determines the visitor is qualified to rent the property when the qualification information and data are within a rental criteria as configured for renting the property; and,
   a management interface being available to a manager of a property, wherein the management interface communicates with the central property application over the network, the management interface allowing the manager to configure the rental criteria for renting the property;
   wherein when the visitor is determined to be qualified to rent the property, the automated entry application allows the visitor to enter the property for an automated showing of the property;
   wherein the central property application running on the server enables the visitor to unlock a lock box or an automated door lock, including
      coordinating with the lock box or the automated door lock to obtain code information that is valid to open the lockbox or the automated door lock, and
      providing automated entry information to the visitor that allows the visitor to enter the property, the automated entry information including the code information;
   wherein the portable device sends a wireless signal to the lock box or the automated door lock to unlock the lock box or the automated door lock, including:
      checking, by the lock box or the automated door lock, a current time and the code information to determine whether the code information is valid,
      opening, by the lock box or the automated door lock to facilitate automated entry to the property when both the code information is valid, and
      not opening, by the lock box or the automated door lock, to prevent automated entry to the property when either the code information is invalid; and
   wherein, as a result of visitor visiting the property, the automated entry application selects other properties available to tour, invites the visitor to tour the other properties and opens up the other properties for automated showing to the visitor.

2. An automated entry system as in claim 1, wherein the portable device of the visitor obtains an identifying number of the lock box or the automated door lock by the visitor entering the identifying number through an interface of the portable device.

3. An automated entry system as in claim 1, wherein the portable device of the visitor obtains an identifying number of the lock box or the automated door lock from the lock box or the automated door lock via a connection between the portable device and the lock box or the automated door lock.

4. An automated entry system as in claim 1, wherein the portable device of the visitor obtains an identifying number of the lock box or the automated door lock and wherein the identifying number is a serial number of the lock box or the automated door lock.

5. An automated entry system as in claim 1, wherein the portable device obtains from the visitor survey information pertaining to visitor interest in the property.

6. An automated entry system as in claim 1, wherein the portable device provides to the visitor location information pertaining to the property.

7. An automated entry system as in claim 1, wherein the central property application enables the visitor to unlock the lock box or the automated door lock by sending to the automated entry application running on the portable device an authorization for the visitor to unlock the wireless enabled lock box or the automated door lock.

8. A method for providing automated entry to properties, comprising:
  receiving a registration of a visitor to use an automated system for visiting properties, the registration including identification of the visitor;
  obtaining from the visitor qualification information about qualifications of the visitor to rent a property, the qualification information including information about income of the visitor;
  allowing the visitor to enter the property for an automated showing of a property only if the visitor is determined from the qualification information to be qualified to rent the property;
  enabling the visitor to unlock a lock box or an automated door lock, including:
    coordinating with the lock box or the short range wireless enabled automated door lock to obtain code information that is valid to open the lockbox or the automated door lock, and
    providing automated entry information to the visitor that allows the visitor to enter the property, the automated entry information including the code information valid; and
  sending a wireless signal, from the portable device of the visitor, to a lock box or an automated door lock to unlock the lock box or the automated door lock, including:
  checking, by the lock box or the automated door lock, a current time and the code information to determine whether the code information is valid,
  opening, by the lock box or the automated door lock to facilitate automated entry to the property when both the code information is valid, and
  not opening, by the lock box or the automated door lock, to prevent automated entry to the property when either the code information is invalid.

9. A method as in claim 8, wherein the portable device of the visitor obtains an identifying number of the lock box or the automated door lock from the lock box or the automated door lock via a connection between the portable device and the lock box or the automated door lock.

10. A method as in claim 8, wherein the portable device of the visitor obtains an identifying number of the lock box or the automated door lock and wherein the identifying number is a serial number of the lock box or the automated door lock.

11. A method as in claim 8, additionally comprising:
  obtaining from the visitor, via the portable device, survey information pertaining to visitor interest in the property.

12. A method as in claim 8, additionally comprising:
  providing to the visitor, via the portable device, location information pertaining to the property.

13. A method as in claim 8, wherein the portable device of the visitor obtains an identifying number of the lock box or the automated door lock by the visitor entering the identifying number through an interface of the portable device.

14. A method as in claim 8, wherein enabling the visitor to unlock the lock box or the automated door lock includes sending, to a portable device of the visitor, an authorization for unlocking the lock box or the automated door lock.

15. A method as in claim 8, additionally comprising:
  providing the visitor with instructions for leaving the property, including a reminder to lock up.

16. Software that when executed on a computing system performs a method for providing automated entry to properties, the method comprising:
  receiving a registration of a visitor to use an automated system for visiting properties, the registration including identification of the visitor;
  obtaining from the visitor qualification information about qualifications of the visitor to rent a property, the qualification information including information about income of the visitor;
  enabling the visitor to unlock a lock box or an automated door lock only if the visitor is determined from the qualification information and the credit information to be qualified to rent the property, including
    coordinating with the lock box or the automated door lock to obtain code information that is valid to open the lockbox or the automated door lock, and
    providing automated entry information to the visitor that allows the visitor to enter the property, the automated entry information including the code information valid;
  providing to the visitor, via the portable device, location information pertaining to the property; and
  sending a wireless signal, from the portable device of the visitor, to the lock box or the automated door lock to unlock the lock box or the automated door lock, including:
    checking, by the lock box or the automated door lock, a current time and the code information to determine whether the code information is valid,
    opening, by the lock box or the automated door lock to facilitate automated entry to the property when both the code information is valid, and
    not opening, by the lock box or the automated door lock, to prevent automated entry to the property when either the code information is invalid.

17. Software as in claim 16, wherein the portable device of the visitor obtains an identifying number of the lock box or the automated door lock from the lock box or the automated door lock via a connection between the portable device and the lock box or the automated door lock.

18. Software as in claim 16, wherein the portable device of the visitor obtains an identifying number of the lock box or the automated door lock and wherein the identifying number is a serial number of the lock box or the automated door lock.

19. Software as in claim 16, wherein enabling the visitor to unlock the lock box or the automated door lock includes sending, to a portable device of the visitor, an authorization for unlocking the lock box or the automated door lock.

20. Software as in claim 16, wherein the portable device of the visitor obtains an identifying number of the lock box or the automated door lock by the visitor entering the identifying number through an interface of the portable device.

* * * * *